(12) United States Patent
Karr et al.

(10) Patent No.: US 7,424,592 B1
(45) Date of Patent: Sep. 9, 2008

(54) SYSTEM AND METHOD FOR IMPLEMENTING VOLUME SETS IN A STORAGE SYSTEM

(75) Inventors: Ronald S. Karr, Palo Alto, CA (US); Randall Ko Shingai, San Jose, CA (US); Michael Root, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 444 days.

(21) Appl. No.: 10/903,103

(22) Filed: Jul. 30, 2004

(51) Int. Cl.
*G06F 9/34* (2006.01)
*G06F 9/26* (2006.01)

(52) U.S. Cl. .................... 711/203; 711/203
(58) Field of Classification Search ................ 711/203
See application file for complete search history.

(56) References Cited

U.S. PATENT DOCUMENTS

| | | | |
|---|---|---|---|
| 5,649,152 A | 7/1997 | Ohran et al. | |
| 6,078,990 A | 6/2000 | Frazier | |
| 6,275,892 B1 | 8/2001 | Arnott | |
| 6,505,307 B1 | 1/2003 | Stell et al. | |
| 6,529,944 B1 | 3/2003 | LeCrone | |
| 6,594,698 B1 * | 7/2003 | Chow et al. | 709/226 |
| 6,918,006 B1 | 7/2005 | Archibald, Jr. et al. | |
| 7,054,890 B2 | 5/2006 | Musante et al. | |
| 7,185,222 B2 | 2/2007 | Burton et al. | |
| 7,225,191 B1 * | 5/2007 | Black | 707/100 |
| 7,236,987 B1 * | 6/2007 | Faulkner et al. | 707/104.1 |
| 2002/0123137 A1 | 9/2002 | Ulrich et al. | |
| 2004/0225914 A1 | 11/2004 | Burton et al. | |

* cited by examiner

*Primary Examiner*—Hyung Sough
*Assistant Examiner*—Hamdy S Ahmed
(74) *Attorney, Agent, or Firm*—Meyertons Hood Kivlin Kowert & Goetzel, P.C.; B. Noël Kivlin; Anthony M. Petro

(57) ABSTRACT

Systems and methods for implementing volume sets in a storage system. According to a first embodiment, a system may include a volume server, a first and a second client computer system, and a plurality of physical block devices. The volume server may be configured to aggregate storage in the plurality of physical block devices into a plurality of logical volumes, wherein a given logical volume includes storage from at least two physical block devices, to distribute a first subset including at least two of the plurality of logical volumes to the first client computer system for input/output as a first volume set configured to be accessed as a single logical device, and to distribute a second subset including at least two of the plurality of logical volumes to the second client computer system for input/output as a second volume set configured to be accessed as a single logical device.

32 Claims, 18 Drawing Sheets

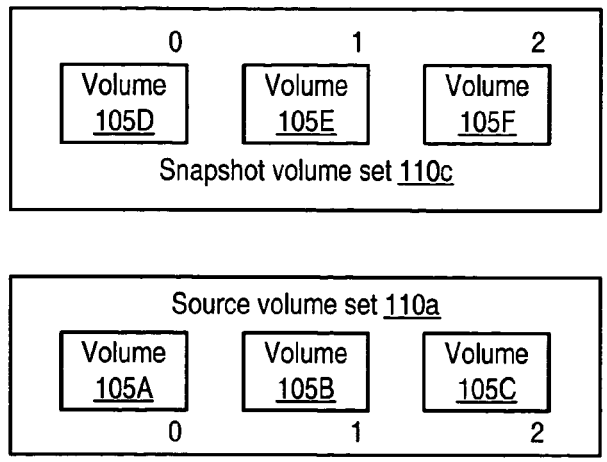
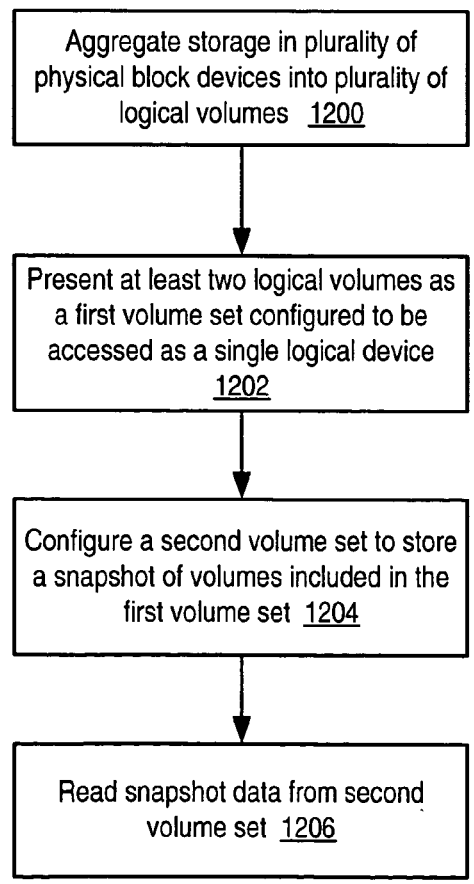
FIG. 11
FIG. 12

SYSTEM AND METHOD FOR IMPLEMENTING VOLUME SETS IN A STORAGE SYSTEM

BACKGROUND

1. Field of the Invention

This invention relates to data storage and, more particularly, to techniques for implementing volume sets in storage systems.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

Often storage is presented to storage consumers as discrete block devices or volumes, each of which may be managed by a storage consumer as a distinct device according to the input/output (I/O) conventions employed by the storage consumer (e.g., typically by virtue of an operating system). However, a storage consumer may wish to provision several volumes having different characteristics for a related purpose. In conventional implementations, such a consumer is required to manage each volume as a separate device, which may make device namespace management more difficult. For example, if the several related volumes were to be migrated from one consumer to another, each volume would have to be explicitly mounted on each new consumer. Further, ensuring that an identical device name is available on the new consumer may be difficult.

SUMMARY

Various systems and methods for implementing volume sets in a storage system are disclosed. According to a first embodiment, a system may include a volume server, a first and a second client computer system, and a plurality of physical block devices. The volume server may be configured to aggregate storage in the plurality of physical block devices into a plurality of logical volumes, wherein a given logical volume includes storage from at least two physical block devices, to distribute a first subset including at least two of the plurality of logical volumes to the first client computer system for input/output as a first volume set configured to be accessed as a single logical device, and to distribute a second subset including at least two of the plurality of logical volumes to the second client computer system for input/output as a second volume set configured to be accessed as a single logical device.

According to a second embodiment, a system may include a plurality of block devices, and a first volume server configured to aggregate storage in the plurality of block devices into a plurality of logical volumes. The first volume server may be further configured to present at least two of the plurality of logical volumes as a first volume set configured to be accessed as a single logical device, and to present at least two of the plurality of logical volumes as a second volume set configured to be accessed as a single logical device, and the second volume set may be configured to replicate data stored in the first volume set.

According to a third embodiment, a system may include a plurality of block devices and a volume server configured to aggregate storage in the plurality of block devices into a plurality of logical volumes. The volume server may be further configured to present at least two of the plurality of logical volumes as a volume set configured to be accessed as a single logical device, and a second logical volume included in the volume set may be configured to store a snapshot of data stored in a first logical volume included in the volume set.

According to a fourth embodiment, a system may include a plurality of block devices and a volume server configured to aggregate storage in the plurality of block devices into a plurality of logical volumes. The volume server may be further configured to present a first subset including at least two of the plurality of logical volumes as a first volume set configured to be accessed as a single logical device, and to present a second subset including at least two of the plurality of logical volumes as a second volume set configured to be accessed as a single logical device. The second volume set may be configured to store a snapshot of data stored in one or more logical volumes included in said first volume set.

According to a fifth embodiment, a system may include a client computer system, a plurality of block devices, and a volume server configured to aggregate storage in the plurality of block devices into a plurality of logical volumes. The volume server may be further configured to present at least two of the plurality of logical volumes as a volume set configured to be accessed as a single logical device, and to map the volume set to a device address space recognizable by an operating system running on the client computer system.

BRIEF DESCRIPTION OF THE DRAWINGS

A better understanding of the present invention can be obtained when the following detailed description is considered in conjunction with the following drawings, in which:

FIG. 11 is a block diagram illustrating one embodiment of a snapshot volume set.

FIG. 12 is a flow diagram illustrating one embodiment of a method of creating a snapshot volume set.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Volumes and Volume Sets

Figure 1:
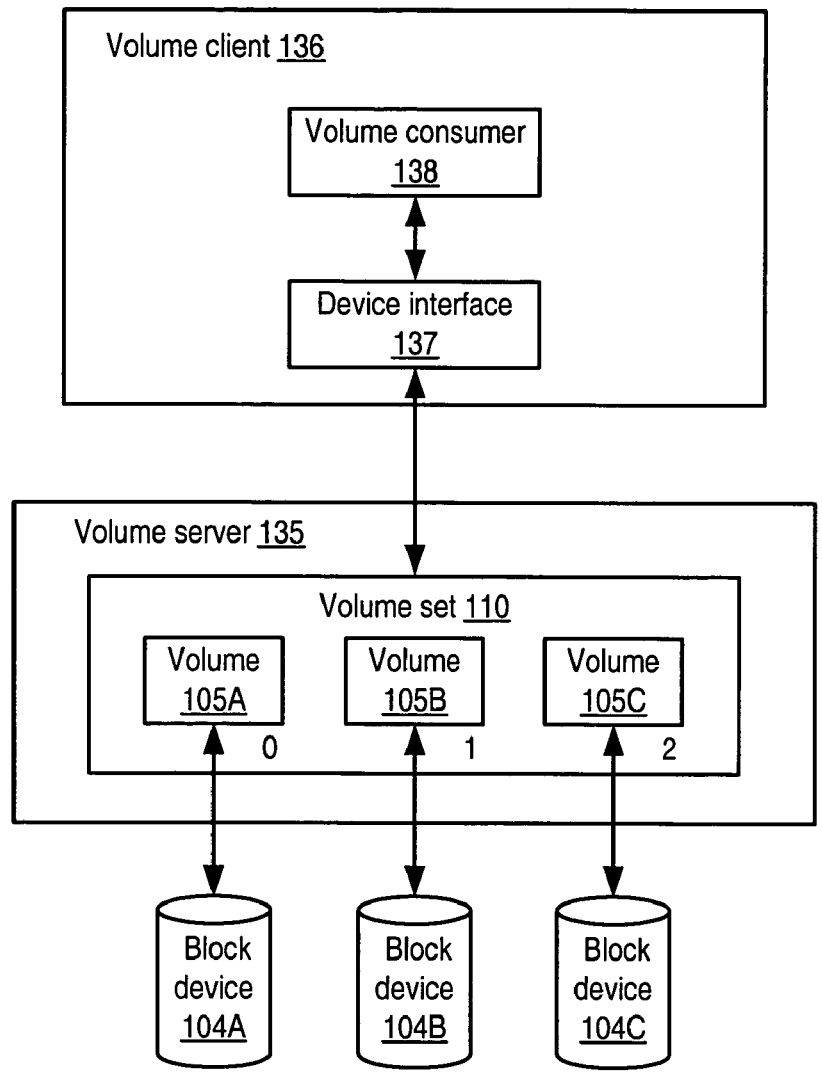
FIG. 1 is a block diagram illustrating one embodiment of a storage system.

FIG. 1 illustrates a storage system 100 according to one embodiment. In the illustrated embodiment, system 100 includes a plurality of block devices 104A-C (collectively, block devices 104) as well as a volume server 135 and a volume client 136. Volume server 135 is configured to aggregate storage in block devices 104 into a plurality of volumes 105A-C. Additionally, volume server 135 is configured to present volumes 105 as a volume set 110. Volume set 110 is presented by volume server 135 as a single device, through which volume client 136 including a volume consumer 138 may access volumes 105 via a single device interface 137.

Generally speaking, a block device 104 may comprise a hardware or software entity that provides a collection of linearly addressed data blocks that can be read or written. For example, in one embodiment a block device 104 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device 104 may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 104 may read or write blocks directly to the device, bypassing any file system that may be in use. In some embodiments, a block device 104 presented by an operating system for use by a consumer may present relatively few primitives through which the device may be manipulated. For example, in one embodiment a block device 104 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 104 that are physical storage devices, such as disks or tape drives, may be configured to present some form of SCSI interface, though other interfaces are possible and contemplated.

Generally speaking, a volume 105 (which may also be referred to herein as a logical volume) may comprise a block device that may be presented directly for use by a block device consumer, i.e., volume consumer 138. In one embodiment, volume consumer 138 may be a file system or an application (such as a database application, for example) that can directly use block devices. As described in greater detail below, in some embodiments employing block device virtualization, a given volume 105 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

In the illustrated embodiment, volume consumer 138 is hosted within volume client 136. As described in greater detail below in conjunction with the descriptions of FIGS. 14-17, volume client 136 may be any type of device capable of interacting with a given volume 105 for data storage and retrieval. For example, in one embodiment a volume client 136 may be a server computer system, including one or more processors and one or more system memories, where the server system is configured to execute software such as one or more operating systems and/or applications. In another embodiment, a volume client 136 may be a client computer system configured to access a given volume 105 via a separate server computer system. In other embodiments, a volume client 136 may be an embedded system configured to use application specific integrated circuit (ASIC) or field-programmable gate array (FPGA) technology to execute operations whereby a given volume 105 may be accessed. Numerous other configurations of volume clients 136 are possible and contemplated. It is also contemplated that in some embodiments, an arbitrary number of volume clients 136 may be employed, and that a given volume client 136 may host an arbitrary number of volume consumers 136.

In some conventional embodiments, a volume consumer 138 may be configured to explicitly name and independently interface with each volume 105 it consumes. In such embodiments, each volume 105 accessed by volume consumer 138 may be identified and managed as a unique device through a respective instance of device interface 137. For example, in one embodiment, a file system may be an instance of a volume consumer 138 configured to access block space defined within three separate volumes. In such an embodiment, the file system may explicitly mount all three volumes as block devices having distinct device names, such as "/dev/vol0", "/dev/vol1", and "/dev/vol2" or other device names as may be appropriate for the operating system environment of volume client 136. Other types of volume consumers 138 are possible and contemplated; for example, in one embodiment a database application may be configured to directly consume one or more volumes 105 without accessing those volumes through a file system.

In some instances, requiring a volume consumer 138 to manage volumes as unique devices may add complexity to the implementation of the volume consumer 138. For example, an administrator may wish to manipulate individual volumes, such as to create a snapshot of data for backup purposes, to configure a given volume to be replicated on another volume client 136 to increase data reliability and/or availability, or to migrate a volume in its entirety to another volume client 136. In such cases, volume consumer 138 may need to dynamically track and manage changes within its device namespace, treating each volume 105 as distinct even when several volumes 105 may be related in their usage, which may complicate the function of volume consumer 138. Additionally, if the collection of volumes 105 were to be moved to a different volume client 136, such as due to a system reconfiguration, it may be difficult to ensure that identical device names as used by an original volume consumer 138 on original volume client 136 are available to a new volume consumer 138 on a different volume client 136. For example, new volume consumer 138 may already mount a volume 105 with a device name "/dev/vol0", such that it cannot use that name to mount a distinct volume mounted with that name by original volume consumer 138.

In the illustrated embodiment, volume server 135 (which may also be referred to herein as a volume coordinator or, in embodiments that support block virtualization such as described below, as a virtualization coordinator) is configured to present volumes 105 to volume consumer 138 collectively as volume set 110, which may be configured to be accessed as a single device via device interface 137. Generally speaking, whereas a given volume 105 may provide a collection of linearly addressed blocks (i.e., a block address space) as described above, in one embodiment a volume set 110 may include a plurality of independent block address spaces corresponding to its constituent volumes 105. It is noted that in various embodiments, a given volume set 110 may include an arbitrary number of volumes 105, and a volume server 135 may manage an arbitrary number of volume sets 110 on behalf of one or more volume clients 136.

Volume server 135 may be configured to manage the volumes 105 within a given volume set 110 as distinct volumes, for example by differentiating volumes 105 using index numbers as in the illustrated embodiment. In one embodiment, volume set 110 may be presented to a volume consumer 138 as a single device, for example a device having the device name "/dev/volset1", in contrast to the three distinct devices noted above. In such an embodiment, a volume consumer 138 may be configured to provide an index number, label, or other volume identifier along with a block number when making a block read or write request to volume set 110 via device interface 137. For example, volume consumer 138 may request to read 5 blocks starting from block number 1435 of volume 0 (i.e., volume 105A of FIG. 1). Volume server 135 may use the provided volume identifier to select the appropriate volume 105 for the requested operation.

In another embodiment, volume server 135 may be configured to provide an operating-system-specific mapping of the volumes 105 within volume set 110 on request. For example, volume server 135 may be configured to map each of volumes 105 to a particular device path or device number, such as a minor number, upon a request from a volume consumer 138 for such a mapping. Volume consumer 138 may then direct block read/write requests to specific device paths or numbers without providing an additional volume identifier as described in the previous embodiment. However, in one embodiment the device paths or numbers provided by volume server 135 for a given volume set 110 may fall within the device namespace associated with volume set 110 and device interface 137. For example, in such an embodiment, device interface 137 associated with volume set 110 may be assigned a single major device number, and individual volumes 105 within volume set 110 may be assigned unique minor device numbers associated with the major device number. Other mapping schemes using schemes other than major and minor numbers (for example, as might be implemented by non-Unix operating systems) are possible and contemplated.

In some embodiments, use of a volume set 110 may enable volume server 135 to more transparently manage the block space available to volume consumer 138. In one embodiment, each volume 105 within volume set 110 may define an independent logical block address space. A given independent logical block address space (corresponding to a particular volume 105) may be added to, removed from, or altered within volume set 110 independently of the other logical block address spaces defined within volume set 110. For example, volume server 135 may be configured to independently grow or shrink individual volumes 105 within volume set 110 without perturbing other volumes. Additionally, volume server 135 may configure various volumes 105 to have various characteristics, such as striping, mirroring, or parity protection, among other types of device characteristics. Volume server 135 may also be configured to add or delete entire volumes 105 from volume set 110. Volume server 135 may be configured to conduct each of these types of activities while maintaining a single device interface 137 to volume consumer 138, such that volume consumer 138 need not manage or even be aware of the details of configuration of each of volumes 105. For example, one or more volumes 105 may correspond to storage on a Small Computer System Interface (SCSI) block storage device 104, while other volumes 105 may correspond to storage on a block storage device 104 using an Integrated Device Electronics (IDE) interface. In a conventional embodiment, volume consumer 138 might mount each of these volumes separately through distinct SCSI and IDE device interfaces 137, whereas in the illustrated embodiment, volume consumer 138 may leave these details to volume server 135 and interact only with a single device interface 137 corresponding to volume set 110. Additionally, volume set 110 may be more easily moved or copied to other volume clients 136, as volume server 135 may be configured to internally preserve the identifiers of each volume 105 regardless of where volume set 110 is mounted. For example, if index numbers are used to distinguish each volume 105, volume 0 may refer to the same entity within volume set 110 for whatever volume client 136 to which volume set 110 is presented.

Block Virtualization

In some embodiments, one or more of volumes 105 within volume set 110 may be virtualized block devices. Specifically, a volume manager, such as volume server 135, may introduce virtualization of blocks, creating some number of virtualized block devices out of one or more physical or logical block devices. (In some embodiments, physical storage devices such as disk arrays may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Volume server 135 may provide functions such as configuration management of virtualized block devices and distributed coordination of block device virtualization. For example, in one embodiment volume server 135 may be aware of the type and quantity of physical storage devices, such as block devices 104, that are available within a storage system. In various embodiments, the virtualization functions provided by volume server 135 may be provided at different levels in the storage hierarchy between a volume consumer 138 and block devices 104.

For example, in one embodiment, volume clients 136 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 135 may be configured to build a volume description that describes how a collection of storage objects compliant with the desired features maps to underlying physical block devices. The volume description identifying a particular volume 105 may be distributed to one or more volume clients 136 as part of a volume set 110. In one embodiment, such a volume description may be a tree of storage objects such as described in greater detail below in conjunction with the description of FIG. 2. Each volume client 136 may be configured to interact with volume server 135 for certain functions, for example management or administrative functions. For typical block read and write activity, each volume client 136 may be configured to interact directly with various block devices 104 according to the volume description distributed by volume server 135.

The structure of the volume 105, for example as indicated by its corresponding storage object tree, may indicate to a given volume client 136 how the volume relates to one or more underlying physical storage devices. In one embodiment, the leaf nodes of such a tree may correspond to one or more physical block devices such as block devices 104, and the root node of such a tree may be a logical block device through which the volume is accessed by a consumer. Distribution of a virtualized block device as a volume to one or more volume clients 136 may also be referred to as distributed block virtualization. In some embodiments, after volume server 135 has distributed a volume description of a given virtual block device to a given volume client 136 as a particular volume 105, the given volume client 136 may interact with that particular volume 105 to read and write blocks without further involvement on the part of volume server 135, as described above. That is, the given volume client 136 may use the structure of the particular volume 105 to transform I/O requests generated by various consumers of that volume 105 into I/O requests directed to specific physical storage devices, such as block devices 104.

In some embodiments, details of block virtualization may not be directly available to individual volume clients 136. In some such embodiments, the virtualization function of volume server 135 may be implemented in a device or layer of abstraction in between volume clients 136 and block devices 104, such as a switch or virtualization appliance. Such virtualization may also be referred to as switch-based or appliance-based virtualization. In some embodiments of switch-based virtualization, a given volume set 110 may be presented to each volume client 136 as a collection of block address spaces as described above, where the details of the virtualization of each volume 105 within given volume set 110 may be managed transparently with respect to volume clients 136 by volume server 135.

Additionally, in some embodiments, multiple layers of virtualization may be employed, for example at the host level as well as at the switch or appliance level. In such embodiments, some aspects of virtualization may be visible to volume clients 136, as in the host-based model, while some aspects may be implemented transparently by an intermediate device, as in the switch-based model. Further, in some multilayer embodiments, the virtualization details of one block device (e.g., one volume 105 within a given volume set 110) may be fully defined to a volume client 136 (i.e., without further virtualization at the switch layer), while the virtualization details of another block device (e.g., another volume 105 within given volume set 110) may be partially or entirely transparent to volume client 136. Exemplary embodiments of various block virtualization system configurations are described in greater detail below in conjunction with the descriptions of FIGS. 16-18.

Figure 2:
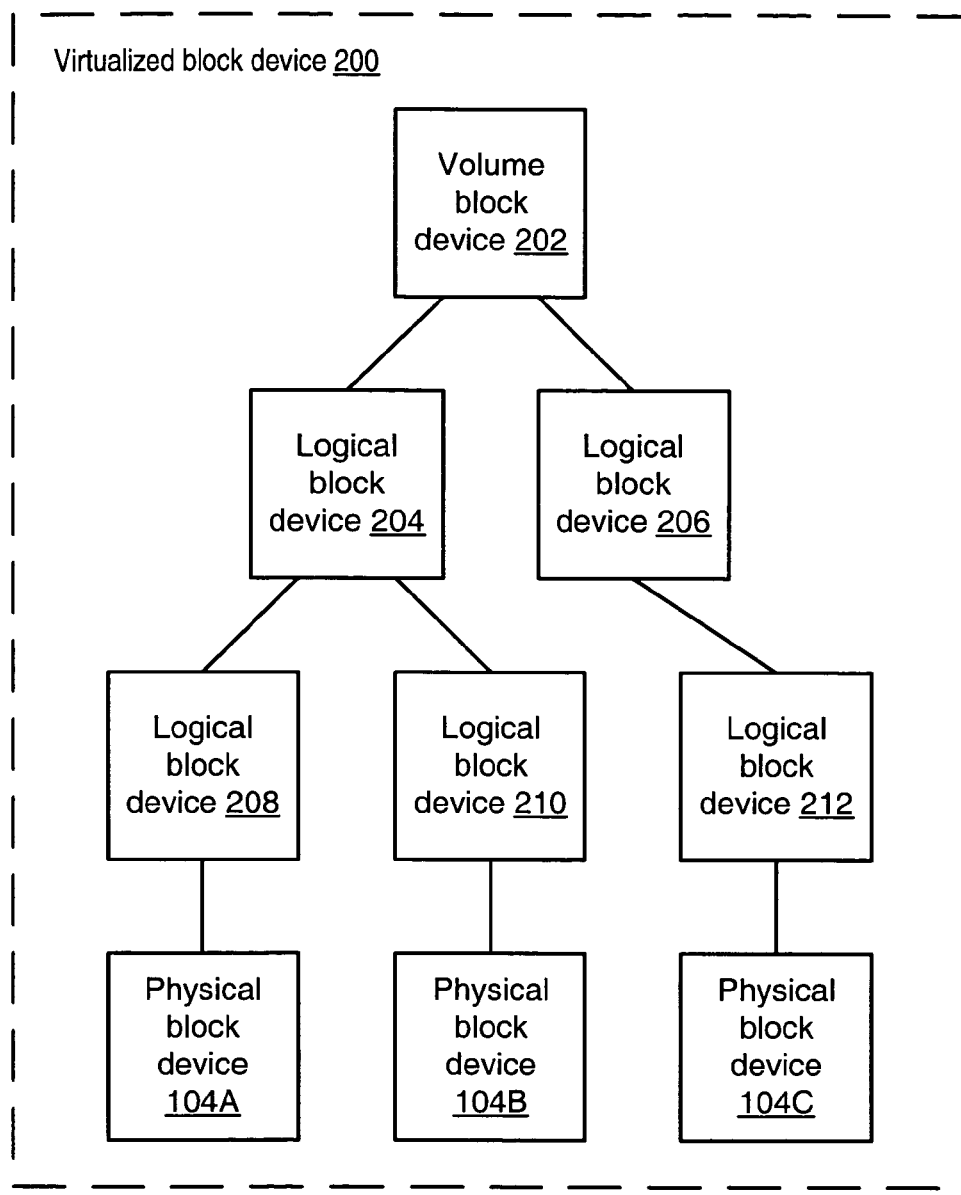
FIG. 2 is a block diagram illustrating one embodiment of a virtualized block device that may be presented as a volume.

One embodiment of a virtualized block device that may be presented to a volume client 136 as a volume 105 within a volume set 110 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 104A-C of FIG. 1, respectively.

Virtualized block device 200 may in its entirety represent the structure of the data comprising a given volume 105, which data may be physically stored in physical block devices 104A-C. Volume block device 202 may be configured to be mounted within a file system or presented to an application or other volume consumer as the interface through which the consumer may interact with given volume 105. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 105. Volume block device 202 may duplicate the write operation and issue the write operation to both logical block devices 204 and 206, such that the block is written to both devices. In this context, logical block devices 204 and 206 may be referred to as mirror devices. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 104A-C have dissimilar performance characteristics; specifically, devices 104A-B may be slower than device 104C.

In order to balance the performance of the mirror devices, in one embodiment, logical block device 204 may be implemented as a striped device in which data is distributed between logical block devices 208 and 210. For example, even- and odd-numbered blocks of logical block device 204 may be mapped to logical block devices 208 and 210 respectively, each of which may be configured to map in turn to all or some portion of physical block devices 104A-B respectively. In such an embodiment, block read/write throughput may be increased over a non-striped configuration, as logical block device 204 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 104C may employ a different block size than logical block device 206. In such an embodiment, logical block device 212 may be configured to translate between the two physical block sizes and to map the logical block space define by logical block device 206 to the physical block space defined by physical block device 104C. In some instances, the logical block space of logical block device 212 need not be contiguously mapped to blocks of physical block device 104C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc.

In one embodiment, volume server 135 may be configured to read and update configuration information corresponding to volume descriptions (such as a storage object tree corresponding to a given volume) from a configuration database (not shown), which may be implemented either within volume server 135 or external to it. The configuration information in the database may establish the logical configuration of data on the physical storage devices 104 (e.g., block devices 104A, 104B, and 104C). For example, such configuration information may indicate how various logical and physical block devices are divided, striped, mirrored, etc. In one embodiment, the configuration information may be stored on the devices (e.g., block devices 104A, 104B, and 104C) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 105 is distributed to more than one volume client 136, any changes that affect the structure of the given volume 105 may need to be coherently coordinated among the relevant volume clients 136. In one embodiment volume server 135 may be configured to coordinate such changes. For example, volume server 135 may be configured to coordinate quiescence of those volume clients 136 to which the given volume 105 is distributed, in order to temporarily suspend activity to given volume 105. Volume server 135 may further distribute changes to the structure of given volume 105 to relevant volume clients 136 in an effectively atomic fashion, such that either all or none of the relevant clients 136 receive the changes.

In some embodiments, volume server 135 may be configured to distribute all defined volume sets 110, which may include block-virtualized volumes 105, to each volume client 136 present within a system. Such embodiments may be referred to as symmetric distributed block virtualization systems. In other embodiments, specific volume sets 110 may be distributed only to respective volume clients 136, such that at least one volume set 110 is not common to two volume clients 136. Such embodiments may be referred to as asymmetric distributed block virtualization systems.

Figure 3:
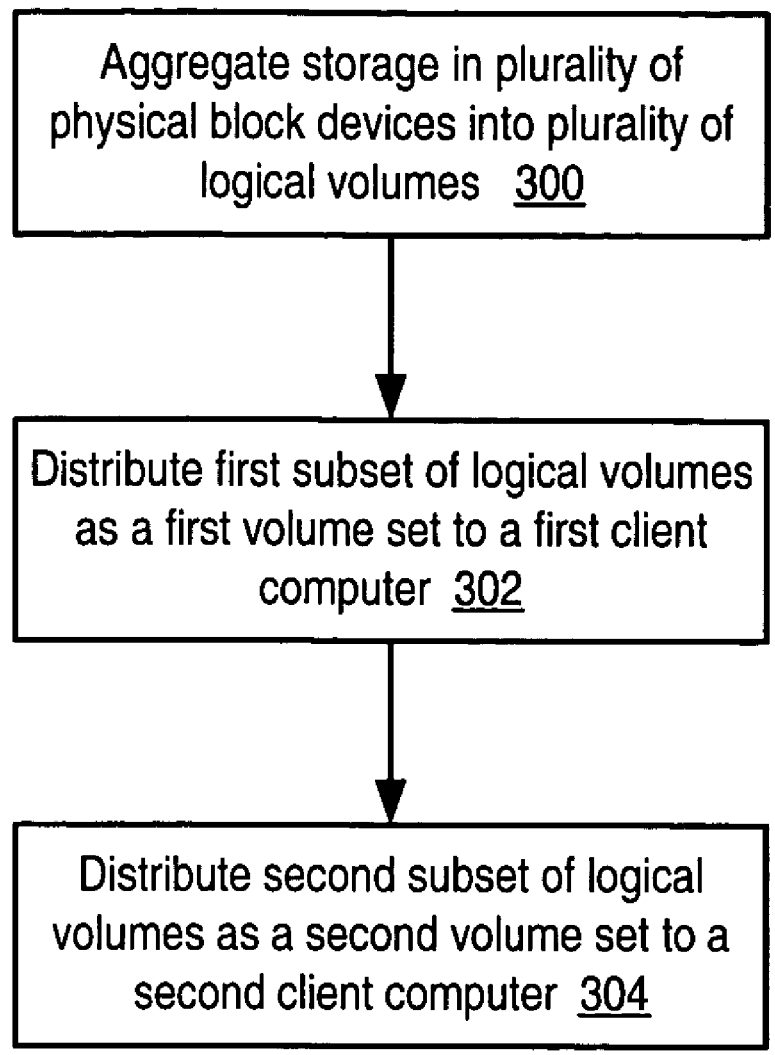
FIG. 3 is a flow diagram illustrating one embodiment of a method of distributing block-virtualized devices as volume sets.

One embodiment of a method of distributing block-virtualized devices as volume sets is illustrated in FIG. 3. Referring collectively to FIG. 1 through FIG. 3, operation begins in block 300 where storage in a plurality of physical block devices is aggregated into a plurality of logical volumes, where a given logical volume includes storage from at least two physical block devices. For example, volume server 135 may be configured to aggregate storage of block devices 104 into logical volumes 105 as described above.

Subsequently, a first subset of the logical volumes are distributed to a first client computer system for input/output as a first volume set accessible as a single logical device (block 302), and a second subset of the logical volumes are distributed to a second client computer system for input/output as a second volume set accessible as a single logical device (block 304). For example, volume server 135 may be configured to distribute one subset of volumes 105 as a first volume set 110 to a first volume client 136, and a second subset of volumes 105 as a second volume set 110 to a second volume client 136. In some embodiments, the first and second volume sets 110 may include the same volumes 105, whereas in other embodiments they may include different volumes 105.

Replication of Volume Sets

In one embodiment, a given volume set 110 distributed to a given volume client 136 may be replicated by another volume set 110. Generally speaking, source data stored on one block device, volume, or volume set may be replicated by copying it to another block device, volume, or volume set. In various embodiments, such copying may occur on the basis of individual blocks, files, or other defined aggregations of data. In one embodiment, replicated data may be updated continuously or at intervals to reflect write activity that has modified the original source data. In such an embodiment, at a given point in time replicated data may not reflect all write activity to the source data, depending on the quantity of write activity that has occurred, the delay in communicating write activity to the replicated storage, and the delay in actually committing write activity to the replicated storage. That is, replicated data may lag source data with respect to write activity. However, it is possible for replicated data to exactly reflect source data, such as in the case that all pending write activity has been committed to the replicated storage while no new write activity has occurred to the source data. In one embodiment, replicating data may differ from forming a snapshot of data, in that replication may be ongoing in time (i.e., may continuously reflect new write activity) whereas a snapshot may reflect the state of data at a fixed point in time, subsequent to which write activity not reflected in the snapshot may occur.

Data replication may be used to increase data availability and/or reliability. For example, in one embodiment data replication may be used to ensure that a more-or-less current copy of data is continually maintained on a remote archival storage device, such as a disk farm in a highly secure facility. Such an embodiment may ensure that a current or near-current copy of critical data is available in case of a catastrophic failure of primary data storage. In another embodiment, data generated at one geographic location may be frequently queried by applications running at a distant geographic location. Rather than requiring the distant applications to query the data at its source, thereby incurring network latency for each query, performance may be improved by replicating the relevant data to storage that is local to the querying applications.

Figure 4:
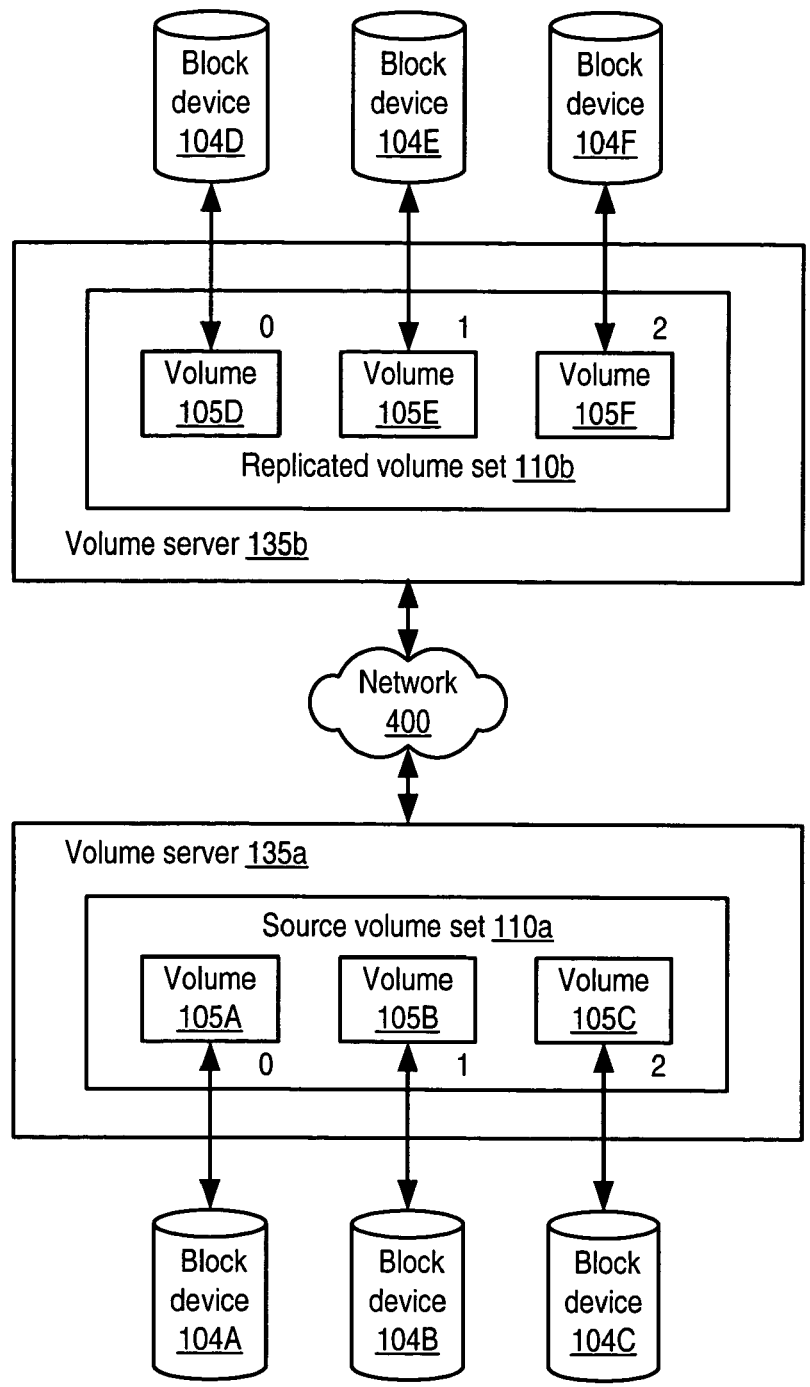
FIG. 4 is a block diagram illustrating one embodiment of volume set replication.

One embodiment of volume set replication is illustrated in FIG. 4. In the illustrated embodiment, volume server 135*a* is configured to aggregate storage in a plurality of block devices 104A-C into a plurality of volumes 105A-C presented as a source volume set 110*a*. Similarly, volume server 135*b* is configured to aggregate storage in a plurality of block devices 104D-F into a plurality of volumes 105D-F presented as a replicated volume set 110*b*. Volume server 135*a* is configured to communicate with volume server 135*b* via network 400, through which replication of source volume set 110*a* may be coordinated as described below. Both volume servers 135*a-b* as well as their included and related elements may be illustrative of volume server 135 and corresponding elements illustrated in FIG. 1. Additionally, it is contemplated that either or both of volume sets 110*a-b* may be consumed by a volume consumer such as described above with respect to volume consumer 138.

In one embodiment, source volume set 110*a* and replicated volume set 110*b* may be configured to preserve a one-to-one correspondence between their constituent volumes 105 and the block address spaces defined within volumes 105, such that a given source block in the source volume set corresponds to a given replicated block in the replicated volume set. In some instances, the relative index or name of each corresponding volume 105 within volumes sets 110*a-b* may be identical, while in other cases a mapping may be employed to related corresponding volumes 105. For example, in the illustrated embodiment, volume 105A in source volume set 110*a* may correspond to volume 105D in replicated volume set 110*b*, and both of these volumes may be indexed as volume 0 within their respective volume sets. In such an embodiment, any given block within any given volume 105 within replicated volume set 110*b* may be accessed using the same identification scheme (e.g., index or name along with block number) as that used to identify the given block within corresponding volume 105 of source volume set 110*a*. In another embodiment, the volumes 105 within replicated volume set 110*b* may be indexed or named differently than those within source volume set 110*a*, and one or both of volume servers 135*a-b* may be configured to map volumes appropriately. It is contemplated that while in one embodiment, volume sets 110*a-b* may have a one-to-one correspondence in their volumes 105, such a correspondence need not extend to block devices 104. For example, in one embodiment block virtualization such as described above may be employed along with volume set replication, and different types of block virtualization may be used for source volumes 105A-C as opposed to replicated volumes 105D-F. In such an embodiment, some of source volumes 105A-C may be striped, for example, while replicated volumes 105D-F may not require the performance benefits of striping.

When replicated volume set 110b is first configured, if source volume set 110a contains data, then in one embodiment volume server 135a may be configured to synchronize volume sets 110a-b by conveying data to volume server 135b via network 400. Thereafter, if write activity occurs to one of the volumes 105A-C within source volume set 110a (such as from one or more volume consumers 138), volume server 135a may be configured to convey that write activity to volume server 136b via network 400. For example, in one embodiment volume server 135a may convey write activity as a volume index or name, a block index within the identified volume's address space, and the data to be written, along with any other relevant protocols for communication via network 400.

In some embodiments, the order of write activity occurring at volume server 135a may be preserved when committing writes to replicated volume set 110b. For example, in one embodiment volume server 135a may assign an order, such as a sequence number, to each block write that occurs, and may convey the assigned order to volume server 135b along with other details about the block write. As volume server 135b receives block write activity, it may commit that activity to replicated volume set 110b in the order identified by volume server 135a. In another embodiment, volume server 135a may be configured to assign a given block write to an atomic group, and volume server 135b may be configured to atomically commit all block writes within a given atomic group; that is, volume server 135b may guarantee that either all block writes within a given atomic group are committed, or none are. Further, once volume server 135b begins committing block writes within an atomic group, it may be configured to prevent any block within an atomic group from being read (for example, by a volume consumer 138) until all block writes within that atomic group have been committed (or backed out, if the commit process fails). In embodiments where the order of write activity is preserved when writing to replicated volume set 110b (whether using the aforementioned techniques or other ordering techniques), at a given point in time, replicated volume set 110b may represent a consistent image of source volume set 110a with respect to write activity. As noted above, in some instances the contents of replicated volume set 110b may lag behind those of source volume set 110a with respect to uncommitted write activity. In such instances, replicated volume set 110b may represent a consistent image of source volume set 110a at the point prior to occurrence of the uncommitted write activity.

In the illustrated embodiment, volume servers 135a-b may be configured to interact via a network 400. In some such embodiments, each of volume servers 135a-b may be implemented as a separate computer system or other network-ready device. However, in other embodiments it is contemplated that a source volume set 110a may be replicated locally. For example, a single computer system may host both source volume set 110a and replicated volume set 110b. In such embodiments, network 400 may be omitted and volume servers 110a-b may be configured to interact directly, such as through various forms of interprocess communication (IPC). Alternatively, in one such embodiment, a single volume server 135 may be configured to manage both source and replicated volume sets 100a-b. Additionally, although the above embodiments of replication have been described as unidirectional (i.e., writes are propagated from source volume set 110a to replicated volume set 110b), it is contemplated that an alternative embodiment may be configured to perform bidirectional replication. In such an embodiment, writes to replicated volume set 110b may be propagated to volume server 135a and committed to source volume set 110a in a manner analogous to that just described.

Figure 5:
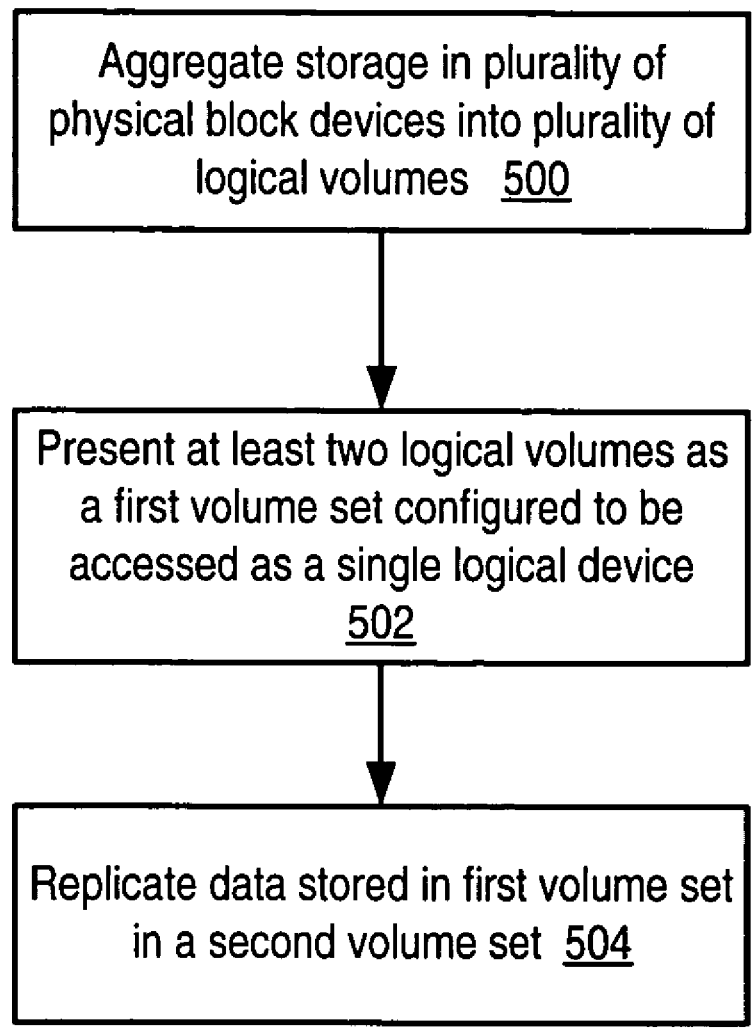
FIG. 5 is a flow diagram illustrating one embodiment of a method of replicating data using volume sets.

One embodiment of a method of replicating data using volume sets is illustrated in FIG. 5. Referring collectively to FIG. 1, FIG. 4 and FIG. 5, operation begins in block 500 where storage in a plurality of physical block devices is aggregated into a plurality of logical volumes. For example, volume server 135a may be configured to aggregate storage of block devices 104A-C into logical volumes 105A-C as described above.

Subsequently, at least two of the plurality of logical volumes are presented as a first volume set configured to be accessed as a single logical device (block 502), and a second volume set is configured to replicate data stored in the first volume set (block 504). For example, volume server 135a may be configured present volumes 105A-C as source volume set 110a, and replicated volume set 110b may be configured to replicate data stored in source volume set 110a as described above.

Snapshots and Volume Sets

In some embodiments, one volume within a volume set, such as volume set 110 of FIG. 1, may be configured to store a snapshot of data stored in another volume within that volume set. Generally speaking, a snapshot of data, however the data may be stored, may be a copy of the data made at or around a given point in time, which may be referred to as the snapshot effective time. That is, a snapshot of data may be a fixed image of the data as of a point or range in time. In some storage system embodiments, snapshots may be used to create archives of data, for example at hourly or daily intervals, which archives may be made available online to users for quick recovery of data and/or transferred to archival media such as tape for longer-term storage.

Figure 6A:
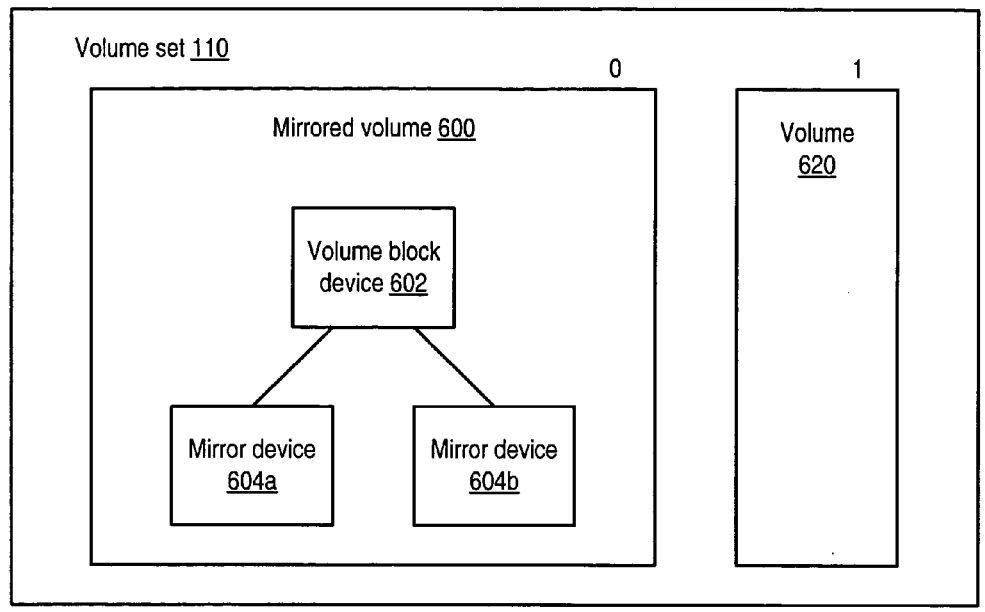
FIGS. 6A-B are block diagrams illustrating one embodiment of a system configured to perform a data snapshot in a volume set using a mirror-and-break-off technique.
Figure 6B:
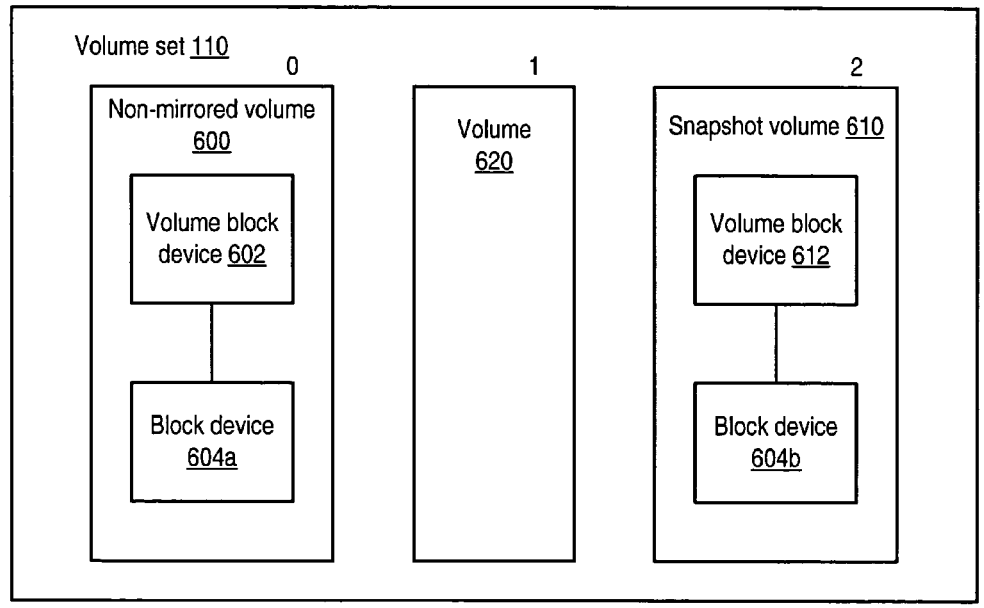

One technique for creating a snapshot of a given volume within a volume set may be referred to as the mirror-and-break-off technique, of which one embodiment is illustrated in FIGS. 6A-B. In the illustrated embodiment of FIG. 6A, volume set 110 includes a mirrored volume 600 as well as another volume 620. These volumes are respectively indexed as volumes 0 and 1 within volume set 110, although other names or indexing techniques may be used as described previously. (It is contemplated that volume 620 may be omitted in other embodiments, or that volume set 110 may include additional volumes.) Mirrored volume 600 is configured as a virtualized block device in the illustrated embodiment and includes a volume block device 602 and mirror devices 604a and 604b. Mirrored volume 600, volume block device 602 and mirror devices 604a-b each may be illustrative, respectively, of virtualized block device 200, volume block device 202, and any of logical block devices 204-212 as described above in conjunction with the description of FIG. 2. Further, each volume illustrated in FIG. 6A-6B may be illustrative of volumes 105 of FIG. 1. Generally speaking, each mirror device within a given mirrored volume may be configured to store a respective copy of the data stored by the mirrored volume. For example, each of mirror devices 604a-b may be configured to store a respective copy of each block addressable by mirrored volume 600. In some embodiments, a mirrored volume may include an arbitrary number of copies stored on an arbitrary number of corresponding mirror devices.

In the illustrated embodiment, mirrored volume 600 may be configured, such as by volume server 135, by modifying a non-mirrored volume in response to a request to create a snapshot using the mirror-and-break-off technique. For example, mirror device 604a may already exist within a non-mirrored volume as a logical or physical block device at the time a snapshot request occurs. Responsively, volume server 135 may add a logical or physical device 604b to volume 600 and configure the volume to function as a mirror. In this case, a period of time may elapse while data is copied to newly added mirror device 604b. Alternatively, mirrored volume 600 may already be configured to mirror data at the time a snapshot request occurs. However, if only two mirror devices 604 are configured at the time a snapshot is requested, and it is desired that mirrored volume 600 continue to mirror data following the snapshot, an additional mirror device 604 may be added as just described.

Once mirror devices 604a-b represent a consistent mirror of the data stored in mirrored volume 600, one of these devices may be broken off or detached from mirrored volume 600 and presented as a separate snapshot volume within the volume set, which reconfiguration may be performed, for example, by volume server 135. One embodiment of a resulting snapshot configuration is illustrated in FIG. 6B. In the illustrated embodiment, volume set 110 includes non-mirrored volume 600, which corresponds to mirrored volume 600 of FIG. 6A. Block device 604a within non-mirrored volume 600 corresponds to mirror device 604a of FIG. 6A. FIG. 6B also shows that volume set 110 includes newly created snapshot volume 610, indexed as volume 2 within volume set 110, and which in turn includes volume block device 612 and block device 604b. Volume block device 612 may be illustrative of volume block device 602, and block device 604b corresponds to mirror device 604b of FIG. 6A. Volume set 110 continues to include volume 620 following creation of snapshot volume 610. It is noted that if mirrored volume 600 includes more than two mirror devices 604 prior to detaching a mirror device to form a snapshot, mirrored volume 600 may continue to mirror its data among the remaining mirror devices 604 following the snapshot-forming detachment.

In the illustrated embodiment, snapshot volume 610 may be created within volume set 110 without modifying or otherwise perturbing other volumes within volume set 110, such as volume 620. Similarly, snapshot volume 610 may be deleted following creation without affecting other volumes within volume set 110. For example, a snapshot volume 610 may be discarded after a certain period of time elapses, or after its data has been copied to another device for archival, such as a tape or optical drive. It is contemplated that in some embodiments, mirrored volume 600 and snapshot volume 610 need not be virtualized block devices. In one such embodiment, snapshot volume 610 may be configured as a mirrored peer volume to volume 600, rather than as a mirror device hierarchically included within volume 600.

In one embodiment, snapshot volume 610 may represent the contents of volume 600 as of the snapshot effective time, and the snapshot effective time may be substantially equivalent to the snapshot request time. For example, if volume 600 was already configured for mirroring at the time a snapshot was requested, volume server 135 may be configured to break off one of the mirror devices 604 with little delay following the request. However, in another embodiment, volume 600 may not be configured for mirroring at the time of the snapshot request, and there may be a delay before the data within volume 600 is mirrored. In such an embodiment, if write activity to volume 600 is suspended while a mirror is created and broken off, the snapshot effective time may be substantially equivalent to the snapshot request time, as the data of volume 600 will not change until the snapshot is complete. However, suspending write activity may unacceptably impact performance of volume 600. As an alternative, write activity to volume 600 may continue until a mirror is detached, in which case the data contents of the resulting snapshot volume 610 may vary from the contents of volume 600 at the snapshot request time, resulting in a snapshot effective time that is a range between the request time and the time of mirror detachment.

It is noted that like in embodiments in which mirrored volume 600 is a virtualized block device, multiple levels of virtualization may be employed, such as are illustrated in FIG. 2. In some such cases, volume server 135 may be configured to exactly replicate the logical or physical block device structure that resides beneath the block device that is being mirrored to form a snapshot. However, in some embodiments, volume server 135 may not use the same device structure to form the snapshot. For example, if high-performance access to snapshot data is not desired, virtualized features such as data striping may be omitted from the mirror device used to form the snapshot.

Figure 7:
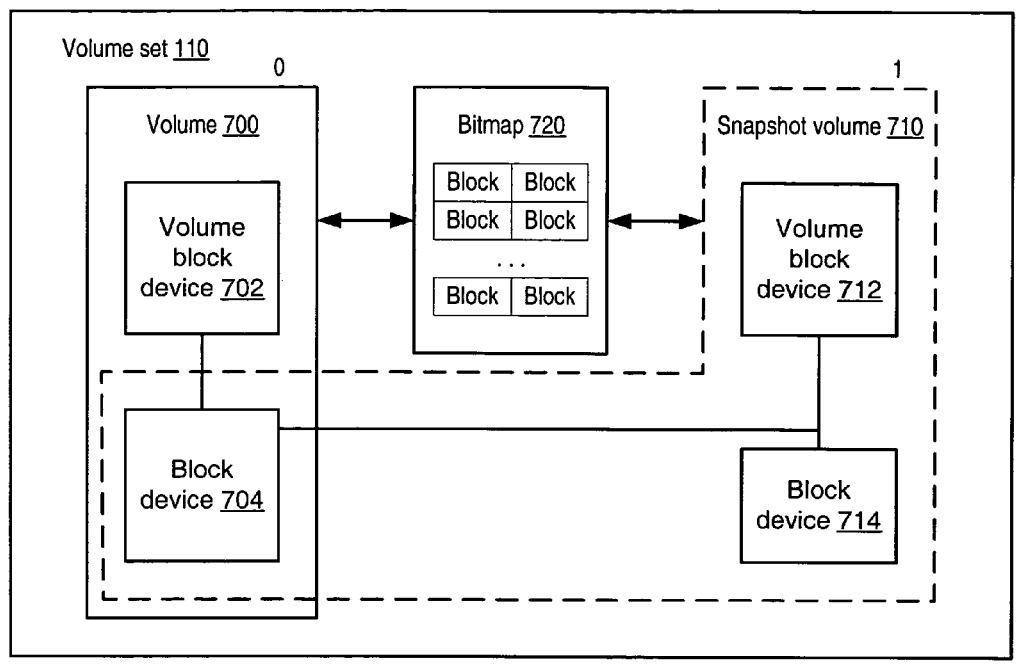
FIG. 7 is a block diagram illustrating one embodiment of a system configured to perform a data snapshot in a volume set using one variant of a copy-on-write technique.

As noted above, if a given volume is not already mirrored at the time a snapshot is requested, or if an additional mirror device destined to be used within a snapshot volume is added, a possibly lengthy delay may be incurred while the new mirror device is synchronized with existing data. Another technique that may mitigate such a delay, which may be referred to as a copy-on-write snapshot or as a type of "instant snapshot," is illustrated in FIG. 7. In the illustrated embodiment, volume set 110 is shown including a volume 700, indexed as volume 0 within the volume set, as well as a snapshot volume 710, indexed as volume 1 within the volume set. Volume 700 further includes a volume block device 702 and a logical or physical block device 704, and snapshot volume 710 further includes a volume block device 712 and a logical or physical block device 714 is shown. Snapshot volume 710 may also reference block device 704 of volume 700 as described below. A bitmap 720 including entries corresponding to each of the logical blocks mapped by volume block device 702 is also shown. In some embodiments, bitmap 720 may be included within volume set 110, while in other embodiments it may be separate from volume set 110 (for example, bitmap 720 may be maintained by a volume server 135 hosting volume set 110). As noted previously, in other embodiments volume set 110 may include a different number of volumes that may be indexed differently.

Volumes 700 and 710 may be illustrative of volumes 105 of FIG. 1, and may or may not be virtualized block devices such as illustrated in FIG. 2. Volume block devices 702 and 712 may be illustrative of similar elements described above. Block devices 704 and 714 may be any logical or physical block device. It is contemplated that in some embodiments, volumes 700 and 710 may include more complex logical structure, including additional block devices not illustrated.

In response to a request to create a snapshot of volume 700 within volume set 110 as of a snapshot effective time, snapshot volume 710 may be configured and bitmap 720 may be created, for example by volume server 135. Subsequent to the snapshot effective time, one or more block writes may be directed to volume 700 by a volume consumer. Prior to the targeted blocks being written within volume 700, bitmap 720 is consulted. If a given bit corresponding to a targeted block is not asserted within bitmap 720, the original value of the targeted block may be copied to block device 714 of snapshot volume 710 before the new value is written to the targeted block of block device 704 within volume 700. Subsequent to such block copying, the corresponding bit within bitmap 720 is asserted. If a given corresponding bit is already asserted at the time the write is detected, the targeted block may be written without its original value being copied.

Subsequently, if a volume consumer such as volume consumer 138 wishes to read one or more data blocks from snapshot volume 710, bitmap 720 is again consulted. If a bit corresponding to a desired data block is asserted, the data block is read from block device 714 associated with snapshot volume 710. However, if the corresponding bit is not asserted, a write operation subsequent to the snapshot effective time has not yet targeted that block, and the desired data block may be read from block device 704 associated with volume 700. That is, storage associated with snapshot volume 710 may be configured to store the original values, as of the snapshot effective time, only of those blocks that have been modified at least once since the snapshot effective time. If relatively few write operations are directed to volume 700, or the write operations that do occur are directed to relatively few blocks, block storage associated with snapshot volume 710 may be relatively sparsely populated, and the delay in copying blocks to create the snapshot may be mitigated relative to the mirror-and-break-off technique.

It is noted that during the period after snapshot volume 710 has been configured and before any writes have occurred to volume 700, no data blocks may have been copied from block device 704 to block device 714. In such a case, any requests to read data blocks from snapshot volume 710 may be fulfilled by accessing block device 704. Consequently, it may be possible to access data blocks within snapshot volume 710 within a period of time following the snapshot effective time that is on the order of the time required to configure snapshot volume 710 and bitmap 720, rather than the time required to completely mirror volume 700. Generally, this configuration time may be substantially less than the mirroring time, such that snapshot volume 710 may be said to be an "instant snapshot" of volume 700 in terms of the relative delay in making snapshot data available for use.

In some embodiments, the operations to detect a read or write operation directed to a given block of volume 700, determine a value of a corresponding bit in bitmap 720, to copy an original value of a targeted block to snapshot volume 710, and to read a snapshot block from either volume 700 or snapshot volume 710 may be implemented on the volume client(s) 136 to which volume set 110 has been distributed. Alternatively, these operations may be performed by volume server 135, or by another device. If volume set 110 is shared by multiple clients 136, the hosts may each maintain a copy of bitmap 720 and coordinate to ensure mutual consistency, or the hosts may coordinate access to a single instance of bitmap 720. In some embodiments, bitmap 720 may be stored within any form of nonvolatile storage that is configured to retain a given value until that value is deliberately overwritten or replaced. For example, nonvolatile storage may include memory media such as nonvolatile RAM (NVRAM or Flash RAM), electrically erasable programmable ROM (EEPROM), or any other solid-state storage technology. Nonvolatile storage may also include magnetic or optical mass storage devices such as hard disks, tape, CD, DVD, etc. In some embodiments, bitmap 720 may be implemented within one or more of block devices 104, within one or more clients 136, within volume server 135, or within another device attached to system 100 of FIG. 1.

Figure 8:
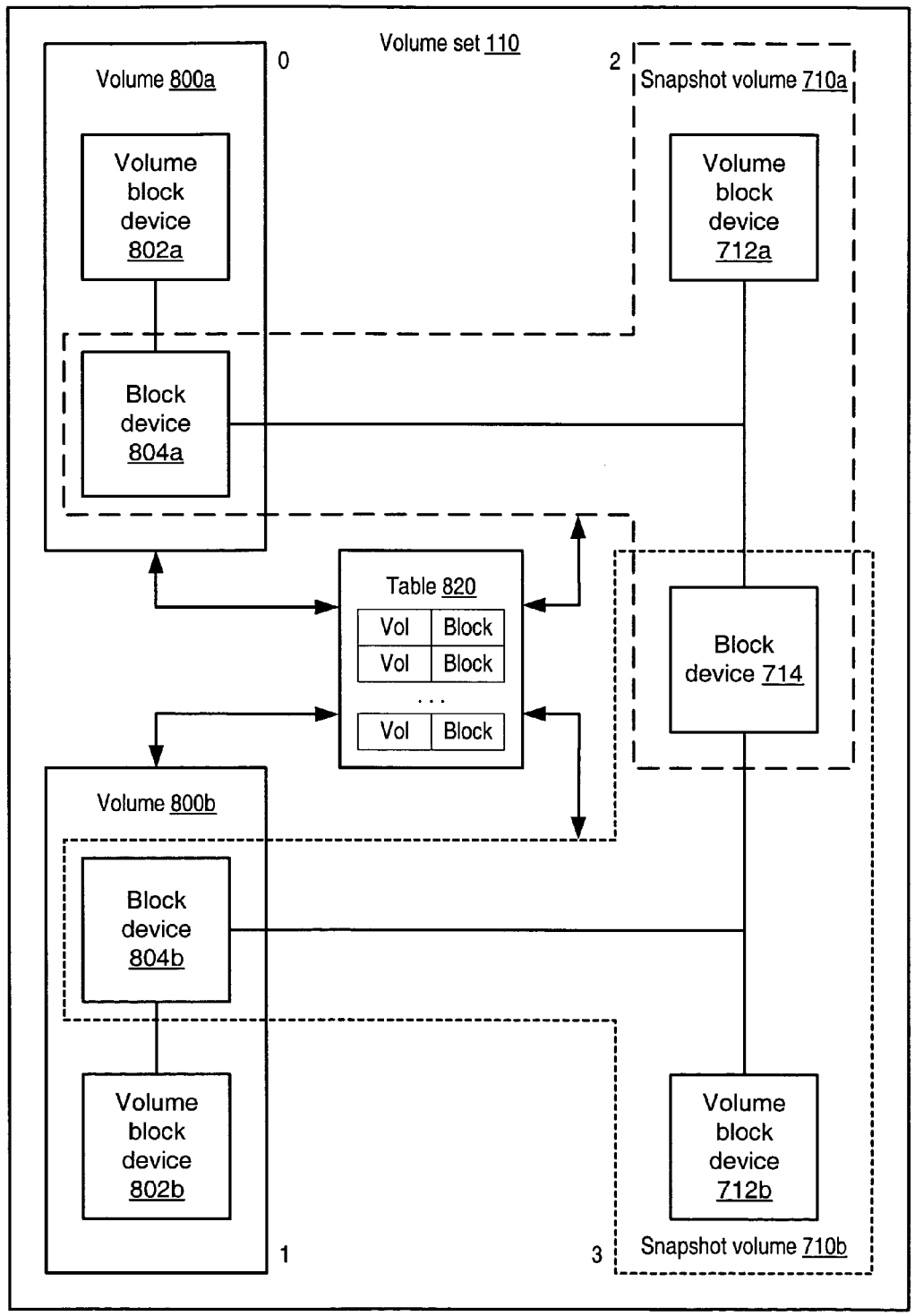
FIG. 8 is a block diagram illustrating one embodiment of a system configured to perform a data snapshot in a volume set using another variant of a copy-on-write technique.

Another variant of a copy-on-write or instant snapshot is illustrated in FIG. 8. In the illustrated embodiment, volume set 110 includes a plurality of volumes 800a-b, respectively indexed as volumes 0 and 1 within the volume set. Volumes 800a-b include respective volume block devices 802a-b and respective logical or physical block devices 804a-b. Also, volume set 110 includes a plurality of snapshot volumes 710a-b, respectively indexed as volumes 2 and 3 within the volume set, and respectively associated as snapshots of volumes 800a-b. Each of snapshot volumes 710a-b includes a respective volume block interface 712a-b, which may be illustrative of volume block interface 712 as described above in conjunction with the description of FIG. 7. Both snapshot volumes 710 may reference logical or physical block device 714. Additionally, a table 820 including entries that may each specify a given data block and corresponding volume identifier is shown. In some embodiments, table 820 may be included within volume set 110, while in other embodiments it may be separate from volume set 110 (for example, table 820 may be maintained by a volume server 135 hosting volume set 110). As noted previously, in other embodiments volume set 110 may include a different number of volumes that may be indexed differently.

As described above, if write activity to a given volume is minimal or directed at relatively few blocks, block storage associated with a corresponding snapshot volume created using the copy-on-write technique may be sparsely populated. Consequently, multiple snapshot volumes within a volume set may be able share a given underlying block device. In the illustrated embodiment, respective snapshot volumes 710 and table 820 may be allocated in response to a request to create a snapshot of a given volume 800 as of a snapshot effective time, similar to the single-volume case shown in FIG. 7. For example, volume server 135 may configure these elements. In some embodiments, all snapshot volumes 710 that are to share a given block device 714 may be identified at a single time and concurrently configured, whereas in other embodiments, snapshots may be requested for additional volumes 800 and additional snapshot volumes 710 may responsively be configured to share given block device 714 at any time. It is noted that in some embodiments, an arbitrary number of snapshot volumes 710 within volume set 110 may share block device 714.

After a given snapshot volume 710 and table 820 have been configured, operation is similar to the embodiment of FIG. 7. However, table 820 is augmented to include information identifying whether an original value of a given block of a given volume 800 has been copied to its respective snapshot volume 710. For example, if volume 800a receives a block write operation after the snapshot effective time, table 820 may be examined to determine whether an entry corresponding to the specified blocks of volume 800a indicates that the original pre-write values of such blocks have not been copied to snapshot volume 710a. The original values of the targeted blocks may then be copied if necessary. Likewise, if snapshot data corresponding to a particular volume 800 is to be read, table 820 may be examined to determine whether a relevant block resides in storage associated with respective snapshot volume 710, e.g., block device 714 or with the particular volume 800, e.g., respective block device 804.

Table 820 may be organized in numerous different ways in various embodiments. In one embodiment, table 820 may simply be multiple instances of bitmap 720, each corresponding to a given volume 800, where the instances may be appended or bit-interleaved to form a single table. In another embodiment, table 820 may include only volume identification and block numbers of blocks that have been copied to respective snapshot volume 710, with omission indicating that blocks have not been copied, or vice versa. In some embodiments, table 820 may include additional information identifying the block number of snapshot volume 710 to which a given block of a corresponding volume 800 has been mapped. For example, in one instance the same numbered block in each of volumes 800a-b may need to be written to snapshot volumes 710a-b due to a write operation. In such an instance, one or both of the blocks may be written to a different block number within underlying block device 714, and table 820 may record the mapping. Alternatively, in some embodiments volume block devices 712a-b may each map the logical blocks of snapshot volumes 710a-b onto block device 714 in any suitable manner without recording mapping information within table 820.

As in the snapshot embodiments described previously, in some embodiments, the operations to detect a read or write operation directed to a given block of volumes 800, to determine a value of a corresponding entry in table 820, to copy an original value of a targeted block to snapshot volume 710, and to read a snapshot block from either a particular volume 800 or snapshot volume 710 may be implemented on the client(s) 136 to which volume set 110 have been distributed. Alternatively, these operations may be performed by volume server 135, or by another device.

Figure 9:
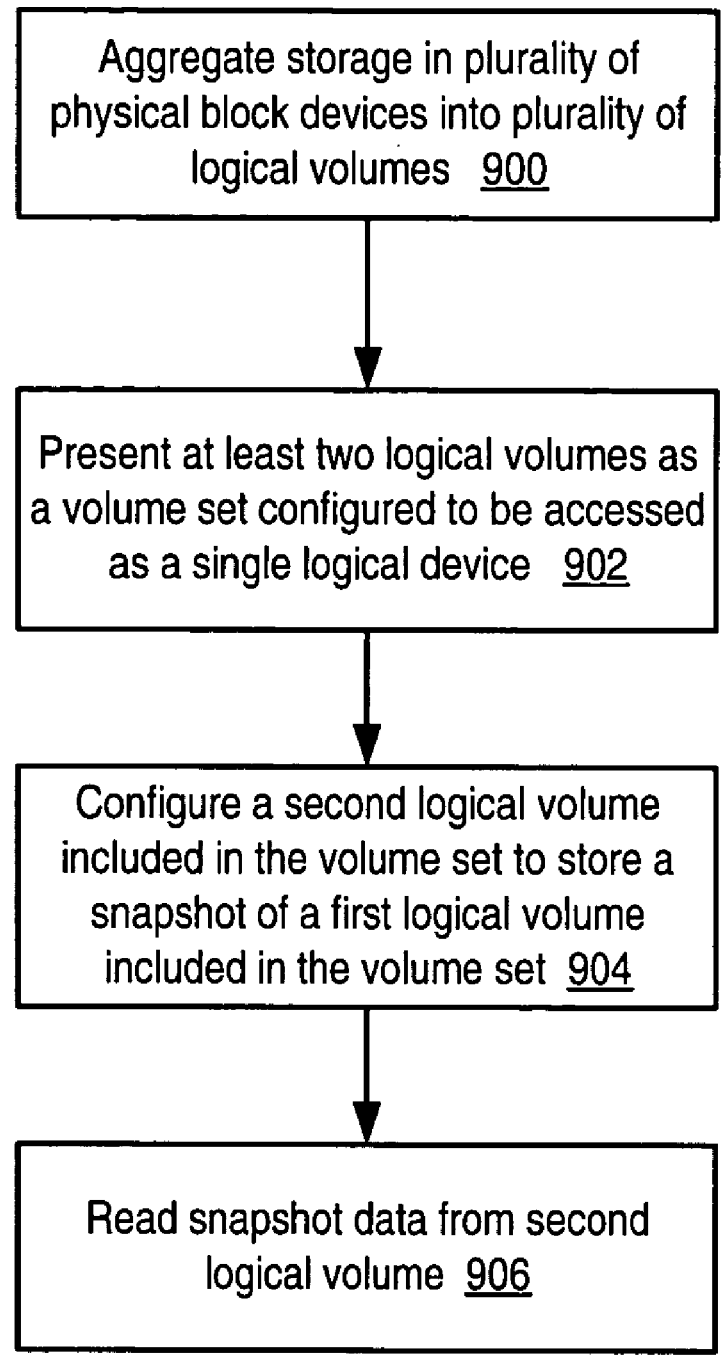
FIG. 9 is a flow diagram illustrating one embodiment of a method of performing snapshots within a volume set.

One embodiment of a method of performing snapshots within a volume set is illustrated in FIG. 9. Referring collectively to FIG. 1, FIG. 2, and FIG. 6 through FIG. 9, operation begins in block 900 where storage in a plurality of block devices is aggregated into a plurality of logical volumes. For example, volume server 135 may be configured to aggregate storage of block devices 104A-C into logical volumes 105A-C as described above.

Following aggregation of storage into logical volumes, at least two of the logical volumes are presented as a volume set configured to be accessed as a single logical device (block 902). For example, volume manager 135 may configure a particular volume set 110 to include a plurality of volumes 105.

After the volume set has been configured, a second logical volume included within the volume set is configured to store a snapshot of data stored in a first logical volume included within the volume set (block 904). For example, one logical volume 105 within volume set 110 may be reconfigured by volume manager 135 to perform the mirror-and-break-off snapshot technique described above. Alternatively, a variant of the copy-on-write technique described above may be employed, or any other snapshot technique suitable for forming a fixed image of the first logical volume at or about a snapshot effective time.

Subsequent to storing a snapshot of the first logical volume in the second logical volume, snapshot data may be read (block 906). For example, an application may interact with the second logical volume to write snapshot data to an archival storage medium.

Figure 10:
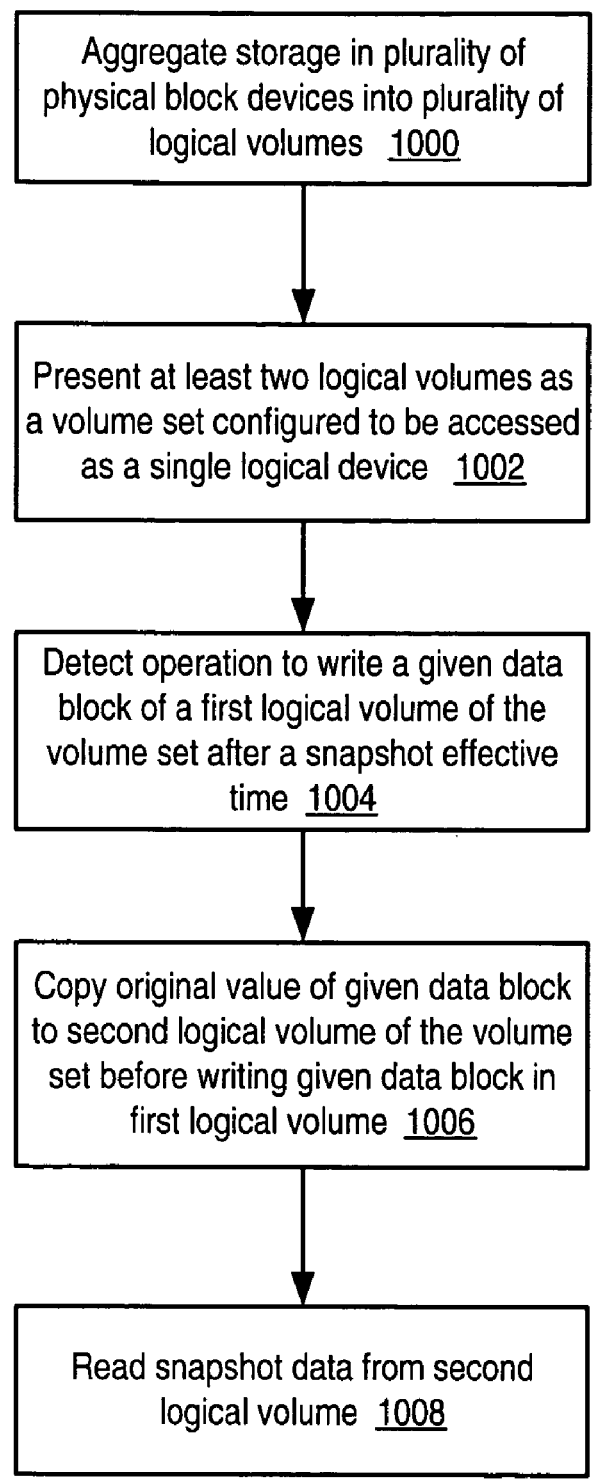
FIG. 10 is a flow diagram illustrating one embodiment of a method of performing instant snapshots within a volume set.

One embodiment of a method of performing instant snapshots within a volume set is illustrated in FIG. 10. Referring collectively to FIG. 1, FIG. 2, FIG. 6 through FIG. 8 and FIG. 10, operation begins in block 1000 where storage in a plurality of block devices is aggregated into a plurality of logical volumes. For example, volume server 135 may be configured to aggregate storage of block devices 104A-C into logical volumes 105A-C as described above.

Following aggregation of storage into logical volumes, at least two of the logical volumes are presented as a volume set configured to be accessed as a single logical device (block 1002). For example, volume manager 135 may configure a particular volume set 110 to include a plurality of volumes 105.

After the volume set has been configured, a second logical volume included within the volume set is configured to store a snapshot of data stored in a first logical volume included within the volume set as of a snapshot effective time, using an instant snapshot technique. First, an operation to write a given data block of the first logical volume after the snapshot effective time may be detected (block 1004). In response to this detection, the original value of the given data block prior to the write operation may be copied to the second logical volume before the given data block is written in the first logical volume (block 1006). For example, bitmap 720 or table 820 may be used to track whether an original value of a given data block has been written to snapshot volume 710.

Following storage of the snapshot, snapshot data may be read (block 1008). For example, bitmap 720 or table 820 may be consulted to determine whether a given data block of the snapshot has been copied to snapshot volume 710 or still resides on the first logical volume. The snapshot data block may then be read from the appropriate device.

As described above, various techniques may be used to create a snapshot volume of a volume within a volume set, where both the snapshot volume and the source volume are in the same volume set. Alternatively, in one embodiment, snapshots of some or all of the volumes within a given volume set may be created, and the snapshot volumes may be presented as a second volume set. One such embodiment of a snapshot volume set is illustrated in FIG. 11. In the illustrated embodiment, source volume set 110a includes three volumes 105A-C that are indexed 0, 1 and 2, respectively. Additionally, snapshot volume set 110c includes three volumes 105D-F, also indexed 0, 1 and 2, respectively.

In the illustrated embodiment, snapshot volume set 110c may be configured as a snapshot of all of the volumes of source volume set 110a as of a given point in time. The individual volumes 105 of snapshot volume set 110c may be created according to any of the snapshot methods described previously, such as the mirror-and-break-off, copy-on-write, or space-saving copy-on-write techniques illustrated in FIGS. 6-8, respectively, or another suitable snapshot method. In some embodiments, different snapshot techniques may be employed for different volumes 105 within source volume set 110a. It is noted that in some embodiments, the index numbers, names, or other identifiers used to distinguish volumes within source volume set 110a may be preserved among volumes within snapshot volume set 110c, allowing individual snapshot volumes to be accessed using the same volume identifier and block number as would be used to access the corresponding source volume.

In one embodiment, each of the volumes 105 within snapshot volume set 110c may be configured to store a snapshot of a corresponding volume 105 within source volume set 110a as of a single point in time. In some such embodiments, an entity coordinating the snapshot activity, such as volume server 135 or volume client 136, may be configured to coordinate the creation of snapshot volume set 110c such that the single-point-in-time relationship among snapshot volumes is ensured, and such that index numbers or other volume identifiers are preserved across the volume sets 110a and 110c. In some embodiments, one or more of the volumes 105 within snapshot volume set 110c may be virtualized block devices such as described previously.

One embodiment of a method of creating a snapshot volume set is illustrated in FIG. 12. Referring collectively to FIG. 1, FIG. 2, FIGS. 6-8 and FIGS. 11-12, operation begins in block 1200 where storage in a plurality of block devices is aggregated into a plurality of logical volumes. For example, volume server 135 may be configured to aggregate storage of block devices 104A-C into logical volumes 105A-C as described above.

Following aggregation of storage into logical volumes, at least two of the logical volumes are presented as a first volume set configured to be accessed as a single logical device (block 1202). For example, volume manager 135 may configure a particular volume set 110 to include a plurality of volumes 105.

After the volume set has been configured, a second volume set is configured to store a snapshot of data stored in one or more volumes included within the first volume set (block 1204). For example, a logical volume 105 within source volume set 110a may be configured, for example by volume manager 135, to perform the mirror-and-break-off snapshot technique described above, resulting in a corresponding snapshot volume 105 within snapshot volume set 110c. Alternatively, a variant of the copy-on-write technique described above may be employed, or any other snapshot technique suitable for forming a fixed image of a volume in the first volume set at or about a snapshot effective time.

Subsequent to storing a snapshot of the first volume set in the second volume set, snapshot data may be read (block 1206). For example, an application may interact with snapshot volume set 110c using the same volume identifiers as source volume set 110a in order to write snapshot data to an archival storage medium.

Volume Tunneling and Volume Sets

As noted above, volume server 135 may be configured to present a volume set 110 including a plurality of volumes 105 to a volume client 136 as a single logical device. In some embodiments, the volume set 110 presented by volume server 135 may be configured as a raw block device; that is, volume set 110 may abstractly appear to a client as a collection of linear block address spaces corresponding to the constituent volumes within the volume set. However, in some such embodiments, a volume client 136 may include an operating system configured to provide an operating environment for applications (such as various volume consumers 138) and to manage access to storage devices such as volume set 110. Further, such an operating system may expect to append operating-system-specific information to a device (i.e., to a raw block device such as may be presented by volume set 110) before, allowing the device to be accessed by a consumer. Such information may also be referred to as metadata.

The operating system metadata may comprise different information for different operating systems. For example, the operating system metadata may comprise information which is located at the beginning of a volume and information which is located at the end of a volume. The operating system metadata may include information identifying what data is stored at which locations in the volume (e.g., a table of contents) and may comprise an identifier for the volume (e.g., a unique name). The operating system metadata may comprise a cylinder alignment and/or cylinder size for the volume, and may include appropriate OS-specific boot code if the volume is intended to be bootable. Typically, a boot program does little more than determine where to find the real operating system and then transfer control to that address.

For example, in one embodiment, a Windows NT or Windows 2000 volume may include the following characteristics represented as metadata: a "magic number" (i.e., numbers that the OS expects to see, usually at or near the start of the disk); a Master Boot Record (MBR) comprising all 512 bytes of sector zero; a fixed size and position on a disk or over a set of disks; a particular cylinder alignment organized as a number of 512-byte blocks that can be read or written to by the OS. Such a volume may include one or more subdisks (Windows 2000) as a group of subdisks called plexes, and may or may not include a file system.

As another example, in one embodiment, a Solaris volume includes a VTOC (virtual table of contents), typically stored as metadata in partition 1. The VTOC may include a layout version identifier, a volume name, the sector size (in bytes) of the volume, the number of partitions in the volume, the free space on the volume, partition headers (each including an ID tag, permission flags, the partition's beginning sector number, and the number of blocks in the partition), and other suitable information.

In some embodiments, volume server 135 may be configured to present different volume sets 110 to different volume clients 136 having different metadata requirements for volumes, according to their respective operating systems. Further, in some embodiments, volume server 135 may be configured to present a single volume set 110 to multiple volume clients 136, each executing different operating systems with different metadata requirements.

In particular, in one embodiment volume server 135 may be configured to map a given volume set 110 to a device address space recognizable by an operating system running on a particular volume client 136. For example, in one embodiment volume server 135 may be configured to present a volume set 110 to a client as one or more SCSI Logical Units (LUNs), where each LUN provides a single, linear block address space. Volume client 136 may be configured to treat each LUN as though it were a distinct physical device (such as a single disk drive, for example), although as described above, volume set 110 and its constituent volumes 105 may themselves be virtualized devices potentially corresponding to many physical devices. By mapping volume set 110 to a device address space, such as a LUN, volume server 135 may enable the volume set 110 to be augmented with the metadata appropriate to a given volume client 136.

Figure 13:
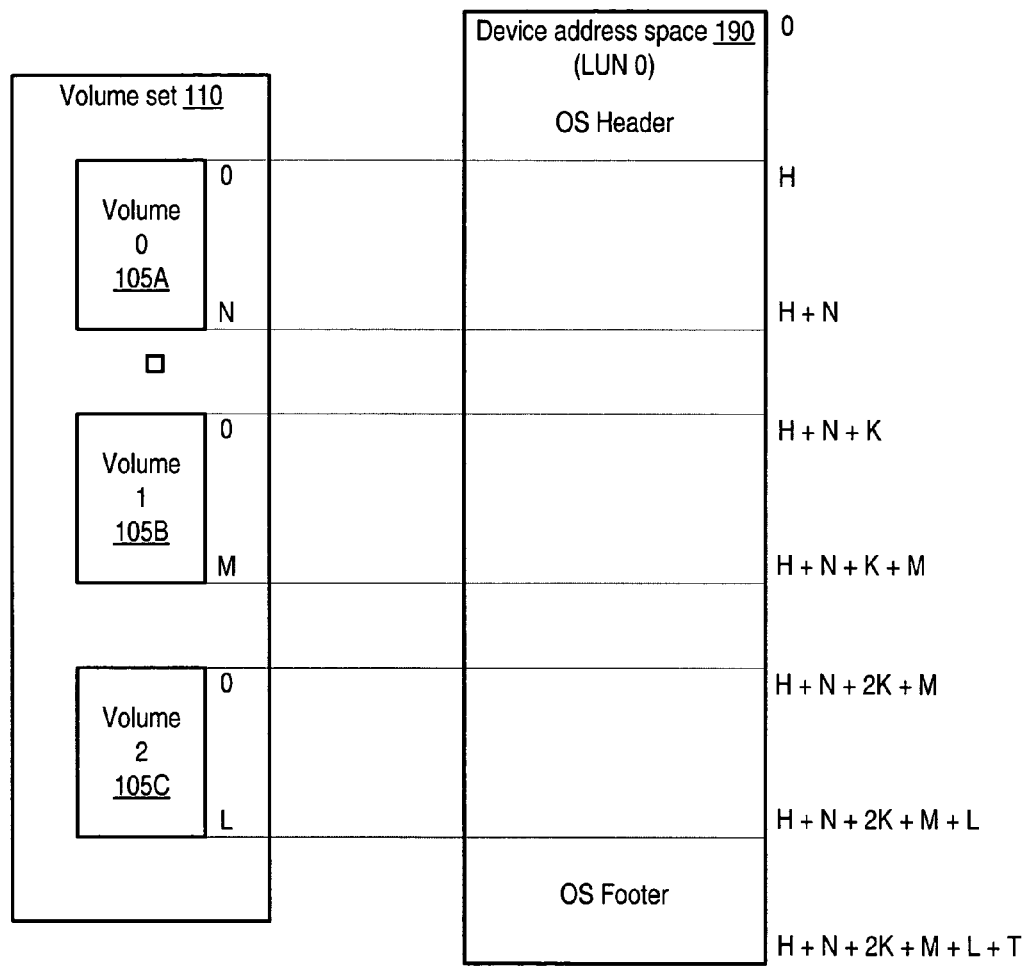
FIG. 13 is a block diagram illustrating one embodiment of a mapping of a volume set to a device address space.

One embodiment of a mapping of a volume set 110 to a device address space, such as a LUN, is illustrated in FIG. 13. In the illustrated embodiment, volume set 110 includes volumes 105A-C, indexed as volumes 0, 1 and 2. Volumes 105A-C include logical block address spaces numbered from 0 to N, 0 to M, and 0 to L, respectively, where N, M and L may be any suitable integers (equal or distinct). In the illustrated embodiment, volume set 110 is mapped into device address space 190, which may be designated LUN 0. Specifically, the individual volumes 105A-C are mapped into device address space 190.

In the illustrated embodiment, blocks 0 to H of device address space 190 are reserved at the beginning of LUN 0 for operating system header information that a volume client 136 may expect to be located at the beginning of a volume. Similarly, T+1 blocks are reserved at the end of LUN 0 for OS footer information. In the illustrated embodiment, K blocks of device address space 190 are left unmapped between the mapped address spaces of each of volumes 105A-C, such that volume 0 maps to blocks H to H+N, volume 1 maps to blocks H+N+K to H+N+K+M, and volume 2 maps to blocks H+N+2K+M to H+N+2K+M+L of device address space 190.

Reserving blocks in device address space 190 between mapped volume address spaces may simplify growing or shrinking individual volumes 105 of volume set 110 in some embodiments. However, it is contemplated that in some embodiments, volume server 135 may map volume set 110 contiguously within device address space 190. It is further contemplated that volume server 135 may employ mappings of arbitrary complexity that need not be contiguous or ordered with respect to volumes 105. For example, in one embodiment the logical block address spaces of volumes 105 may be interleaved in device address space 190.

In some embodiments, volume server 135 may be configured to allow a particular volume client 136 to store its relevant metadata within the allocated sections of device address space 190. In such embodiments, volume server 135 may allocate additional block storage within or external to volume set 110 in which such metadata may be stored. In an alternative embodiment, volume server 135 may be configured to dynamically generate the required metadata upon a request from a volume client 136 to a relevant area of device address space 190. Such an embodiment may facilitate sharing of device address space 190 among several different volume clients 136 having different metadata requirements.

Figure 14:
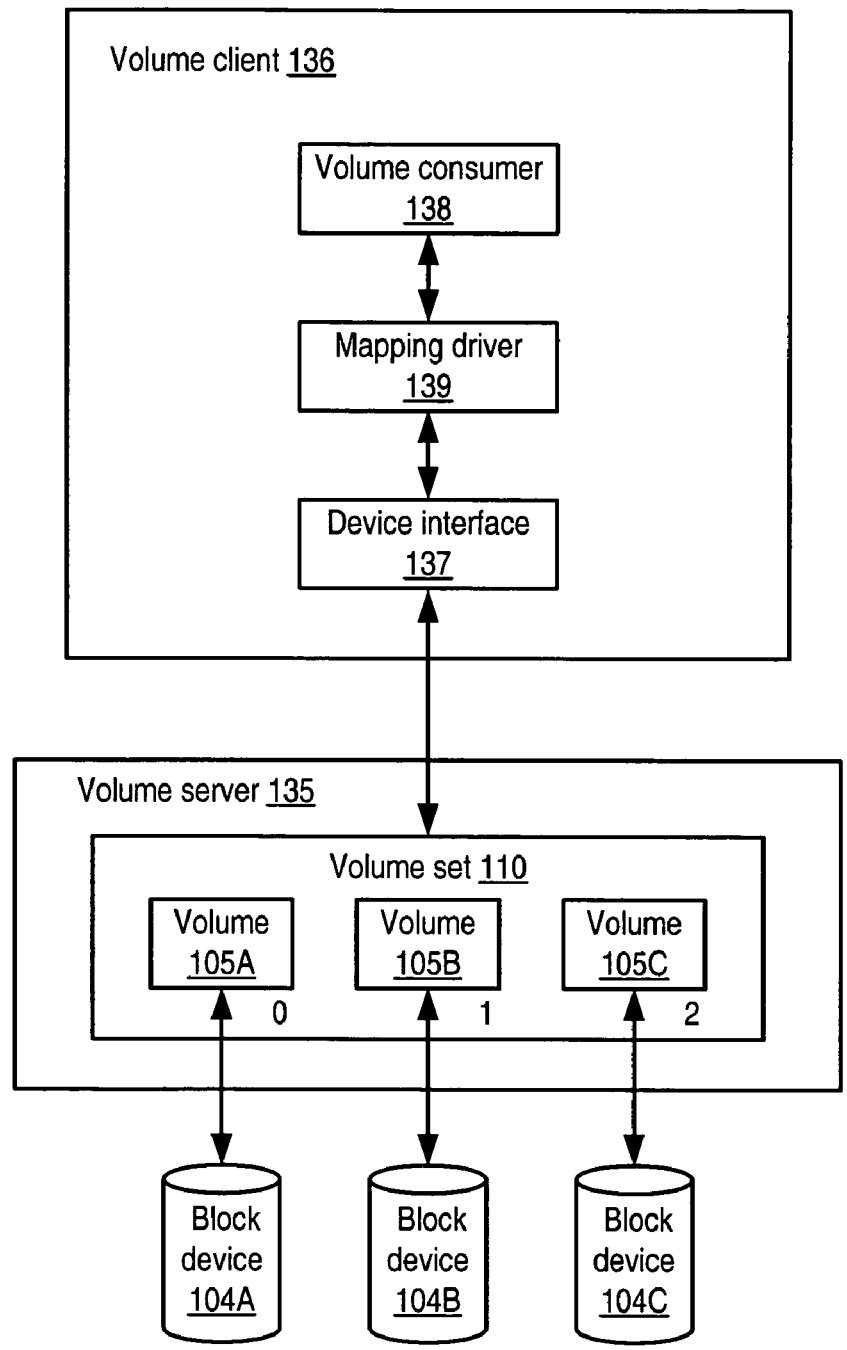
FIG. 14 is a block diagram illustrating one embodiment of a volume client configured to access blocks within a volume set via a device address space according to a mapping.

Once a volume set 110 has been mapped into a device address space 190 such as illustrated in FIG. 13, a volume client 136 may be configured to access blocks within the volume set 110 via the device address space 190, according to the mapping. One such embodiment of a volume client 136 is illustrated in FIG. 14. In the illustrated embodiment, most elements are common to those illustrated in FIG. 1, and volume server 135 presents a volume set 110 to volume client 136 as described above. However, in the illustrated embodiment, a mapping driver 139 is interposed between device interface 137 and volume consumer 138. Device interface 137 may be specifically adapted to a device type consistent with device address space 190, such as a SCSI LUN.

In one embodiment, mapping driver 139 may have access to the same mapping information used by volume server 135 to map volume set 110 into device address space 190. Such an embodiment of mapping driver 139 may be configured, for example, to strip away or hide operating system-specific metadata from a volume consumer 138, and to present volume set 110 to volume consumer 138 as a single logical device comprising multiple independent logical address spaces.

In some embodiments, volume consumer 138 may be configured to interact with volume set 110 to access specific blocks within particular volumes 105. Responsively, mapping driver 139 may map such requests into device address space 190 and convey a block access request (e.g., a read or write) to volume server 135 via device interface 137. Volume server 135 may receive such a request and may use its mapping information to translate from device address space 190 back to a particular block or blocks within volume set 110. In such an embodiment, volume set 110 may be mapped into device address space 190 for the purpose of presenting volume set 110 to volume client 136, but this mapping may be transparent to specific volume consumers 138 by virtue of mapping driver 139. Such a procedure may be referred to as "volume tunneling" or "volume set tunneling," i.e., a volume set 110 may be "tunneled through" operating-system-specific metadata and/or protocol that may not be used or even visible to the volume set consumer (e.g., volume consumer 138). In some embodiments, the function of volume server 135 may be implemented within a Storage Area Network (SAN) switch such as switch 1710 illustrated in FIG. 17 and described below, or a storage server appliance such as appliance 1820 illustrated in FIG. 18 and described below. Some such embodiments may also be configured to employ volume tunneling such as just described.

Figure 15:
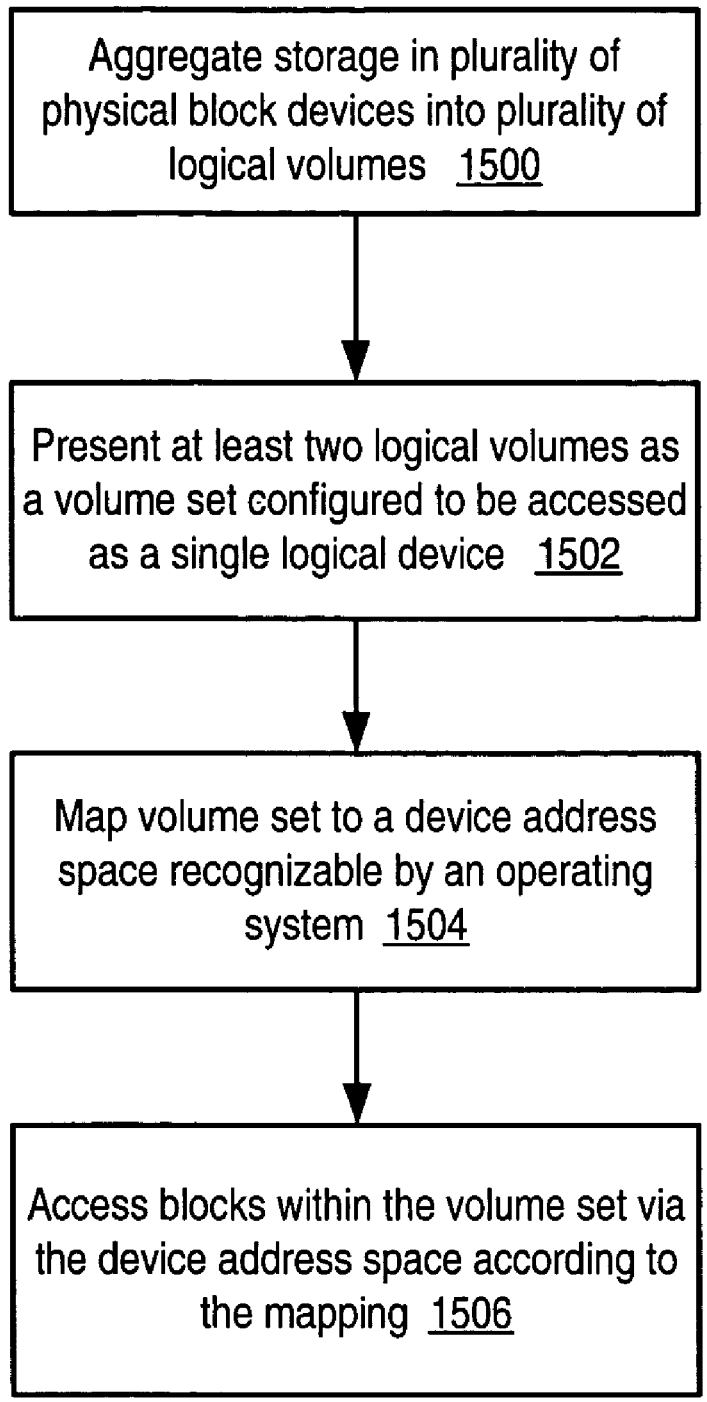
FIG. 15 is a flow diagram illustrating one embodiment of a method of mapping a volume set to a device address space recognizable by an operating system.

One embodiment of a method of mapping a volume set 110 to a device address space 190 recognizable by an operating system is illustrated in FIG. 15. Referring collectively to FIGS. 13-15, operation begins in block 1500 where storage in a plurality of block devices is aggregated into a plurality of logical volumes. For example, volume server 135 may be configured to aggregate storage of block devices 104A-C into logical volumes 105A-C as described above.

Following aggregation of storage into logical volumes, at least two of the logical volumes are presented as a volume set configured to be accessed as a single logical device (block 1502). For example, volume manager 135 may configure a particular volume set 110 to include a plurality of volumes 105.

After the volume set has been configured, the volume set is mapped to a device address space recognizable by an operating system (block 1504). For example, volume manager 135 may map the volumes 105 of volume set 110 to a device address space 190 that may correspond, for example to a SCSI LUN recognizable by an operating system executing on a volume client 136.

Subsequent to mapping of the volume set, blocks within the volume set are accessed via the device address space according to the mapping (block 1506). For example, a volume consumer 138 may be configured to access blocks within volume set 110 through a mapping driver 139, which in turn may be configured to map and demap blocks in device address space 190 according to the mapping of volume set 110 employed by volume server 135.

Exemplary Computing System Embodiments

Figure 16:
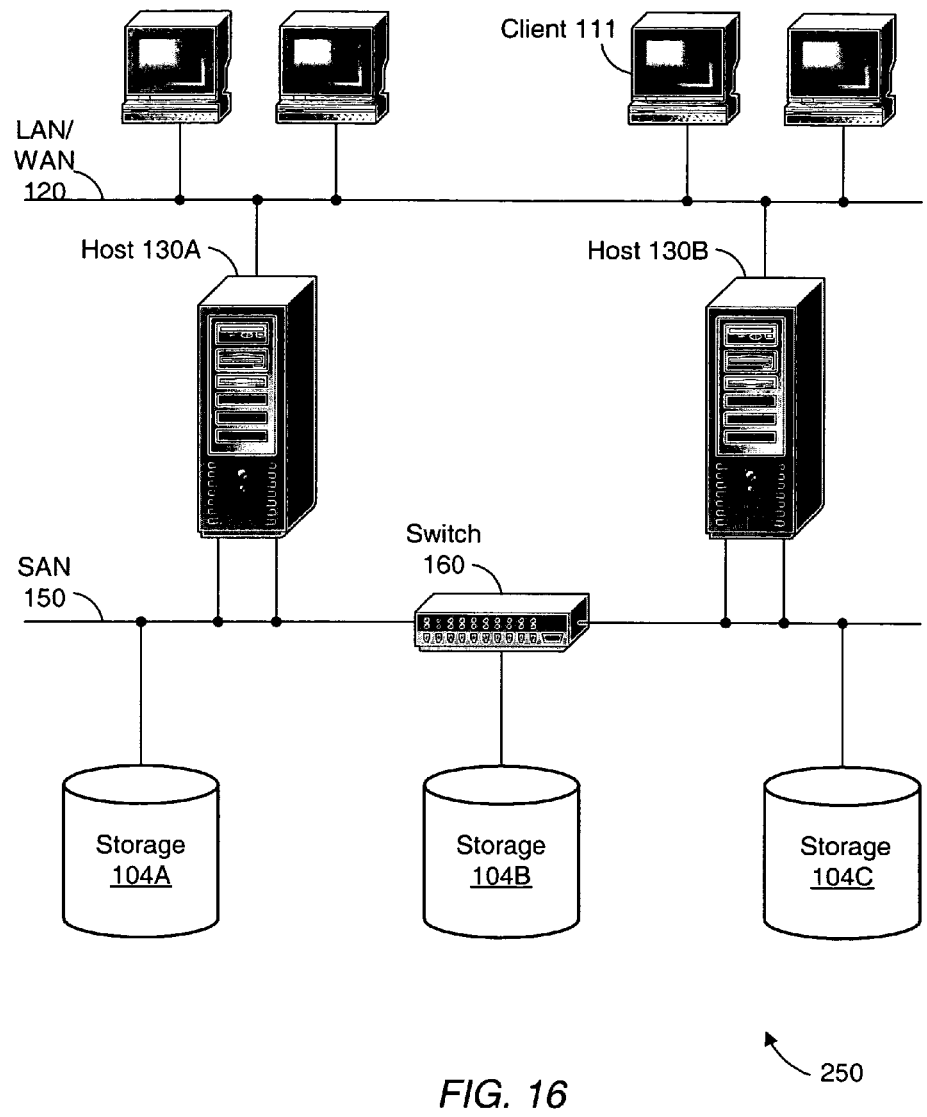
FIG. 16 is a block diagram illustrating one embodiment of a computing system.
Figure 17:
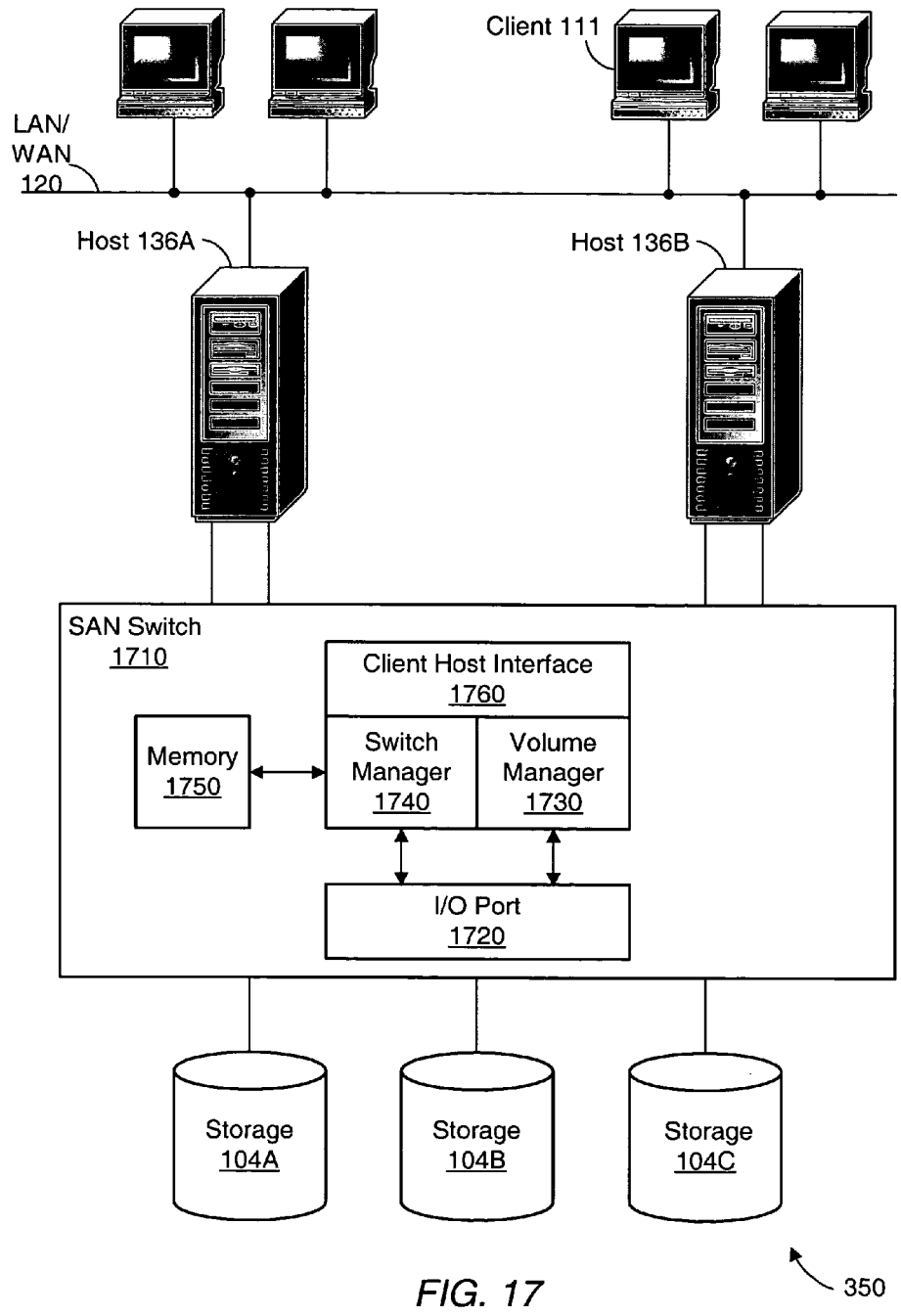
FIG. 17 is a block diagram illustrating one embodiment of a computing system configured to perform switch-based block virtualization.

The techniques described above employing block virtualization, replication, snapshots and volume tunneling in combination with volume sets may be implemented in a number of different computing system architectures. FIG. 16 illustrates an example of a computing system 250 according to one embodiment. The members of the computing system 250 may include one or more volume clients 136A-B, which may also be referred to as hosts 136A-B. As members of computing system 250, hosts 136A and 136B may be referred to "nodes." Hosts 136A and 136B, which may typically be some type of application, data or file server, may operate independently of each other, or they may interoperate to form some manner of cluster. Hosts 136A and 136B are typically individual computer systems having some or all of the software and hardware components well known to those having skill in the art. FIG. 17 (described below) illustrates some of the features common to such computer systems. Additionally, hosts 136 may include any of the previously illustrated elements of volume client 136. For example, hosts 136 may be configured to provide device interfaces 137, such as kernel device interfaces, as well as volume consumers 138, such as various applications or other processes. In some embodiments supporting volume tunneling as described above, hosts 136 may include instances of mapping driver 139.

In support of various applications and operations, hosts 136A and 136B may exchange data over various communication links, for example, network 120, typically a local area network (LAN), e.g., an enterprise-wide intranet, or a wide area network (WAN) such as the Internet. Additionally, network 120 provides a communication path for various client computer systems 110 to communicate with hosts 136A and 136B. In addition to network 120, hosts 136A and 136B may communicate with each other over a private network (not shown) in one embodiment.

Other elements of computing system 250 may include a storage area network (SAN) 150, SAN switch 160, and block storage devices 104. As described previously, storage devices (e.g., 104A, 104B, and 104C) may include various devices such as a tape library (typically including one or more tape drives), a group of disk drives (i.e., "just a bunch of disks" or "JBOD"), an intelligent storage array, and other suitable storage means. As shown in FIG. 11, both hosts 136A and 136B are coupled to SAN 150. SAN 150 is conventionally a high-speed network that allows the establishment of direct connections between storage devices 104 and hosts 136A and 136B. Thus, SAN 150 is shared between the hosts and allows for the sharing of storage devices between the hosts to provide greater availability and reliability of storage.

Although hosts 136A and 136B are shown connected to storage devices 104A, 104B, and 104C through SAN switch 160 and SAN 150, this need not be the case. Shared resources may be directly connected to some or all of the hosts in the computing system, and computing system 250 need not include a SAN. Alternatively, hosts 136A and 136B can be connected to multiple SANs. Additionally, SAN switch 160 can be replaced with a SAN router, a SAN hub, or some type of storage appliance.

In various embodiments, block virtualization such as configured by volume server 135 can generally be implemented at the host level, e.g., hosts 136A and 136B, at the storage device level, e.g., within block devices 104 or an array of such devices, and/or at the appliance level, e.g., SAN switch 160. Host-based storage virtualization is perhaps the most common virtualization solution and is typically either packaged with the host's operating system or made available as an add-on product. Host-based virtualization may allow administrators to access advanced storage management functions such as mirroring, RAID sets, redundant pathing, and hot backups (by using mirror splits or snapshots as described above). However, host-based virtualization may add undesirable overhead to the host system. Furthermore, host-based virtualization may complicate global storage management by requiring management on a host-by-host basis. It is noted that in some embodiments of host-based virtualization, the functions of volume server 135 and volume client 136 may be implemented by a single host computer system.

Storage-based virtualization may provide an alternative to host-based virtualization in various embodiments. Storage-based virtualization solutions typically implement intelligent storage devices such as intelligent disk arrays that implement virtualization functions. For example, such devices can allow for movement between different RAID groups without data loss, as well as automatic migration of data from one RAID group to another based upon the frequency of data access. In addition, these products typically permit the creation of multiple data mirrors, which provide additional availability when one of the mirrors is split for hot backups. Storage-based virtualization can also be advantageous in providing the flexibility to modify LUN (logical unit) size, the ability to have multiple hosts see the same LUNs (which is particularly critical with high availability clustering), and remote replication. However, the more heterogeneous the storage devices, the more likely it is that there are multiple virtualization schemes with which a host-level or client-computer-system level application or user will have to contend.

Still another alternative is appliance-based virtualization. Appliance-based virtualization provides users with virtualization between the hosts and the storage, allowing for the same level of control and centralization across the storage architecture. There are generally two kinds of appliance-based virtualization products: in-band and out-of-band. An in-band virtualization appliance is physically located between the host and the storage. The appliance takes the disk requests from the host and fulfills the host's request from the storage attached to the other side of the appliance. This functionality is essentially transparent to the host because the appliance presents itself as disk. The physical location of the appliance is the primary difference between out-of-band and in-band appliances. Out-of-band appliances logically present themselves as if they are located between the host and storage, but they actually reside to the side. This is accomplished with the installation of a driver under the host's disk driver. The appliance driver then receives logical to physical block mappings from the appliance. In providing a common virtualization scheme for all storage devices 104, appliance-based virtualization may simplify the presentation and use of virtual storage devices by client computer systems 110.

FIG. 17 illustrates an example of a computing system 350 according to one embodiment. In the example of FIG. 17, computing system 350 includes two hosts 136A and 136B. Both hosts 136A and 136B execute one or more application programs respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 111 can initiate or request I/O operations against storage devices 104. These I/O operations typically include read and write operations to logical or virtual devices such as volumes, virtual LUNs, and/or virtual disks designed to appear and operate as SCSI LUNs.

SAN switch 1710 is an example of a storage appliance that can implement the systems and methods of the present invention. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. SAN switch 1710 is responsible for creating and managing the virtualization of storage devices 104A, 104B, and 104C. In one example, SAN switch 1710 presents the virtual disks to hosts 136 and client computer systems 111.

In support of the virtualization scheme, SAN switch 1710 may include a volume manager 1730, switch manager 1740, client host interface 1760, memory 1750, and I/O port 1720. Although only one I/O port is illustrated, SAN switch 1710 typically includes multiple I/O ports, e.g., at least one port for each device attached to the switch. Moreover, the elements shown are merely illustrative, and those having ordinary skill in the are will recognize a variety of other architectures that can be used. For example, each port can have one or more associated processors for executing software performing volume manager 1730, switch manager 1740, and client host interface 1760 functionality. Data can be transmitted among ports using a switching fabric (not shown) implementing a crossbar, single-bus, multiple-bus, or shared-memory architecture. Additionally, volume manager 1730, switch manager 1740, and client host interface 1760 are each typically implemented as software, microcode, or some combination of the two executing on a general-purpose microprocessor, general-purpose microcontroller, ASIC, PLD, FPGA, or the like. In this manner, the hardware and/or software operates as an I/O processor. In some embodiments, the functionality of two or more of volume manager 1730, switch manager 1740, and client host interface 1760 is implemented in the same software and/or hardware. For example, volume manager 1730 and switch manager 1740 might be combined into a single software package. Additionally, there can be more than one instantiation of each of volume manager 1730, switch manager 1740, and client host interface 1760 in some implementations.

Volume manager 1730 enables physical resources configured in the computing system to be managed as logical devices. An example of software that performs some or all of the functions of volume manager 1730 is the VERITAS Volume Manager™ product provided by VERITAS Software Corporation. While volume manager 1730 organizes storage devices 104A, 104B, and 104C into one or more volumes, switch manager 1740 is responsible for presenting one or more volumes as one or more virtual disks. In one example, there is a one-to-one correspondence between volumes and virtual disks; however, other mappings may be used as well. In some embodiments, volume manager 1730 and switch manager 1740 collectively perform the functions of volume server 135 described above.

In one embodiment, switch manager 1740 maintains SAN switch 1710 data objects such as access control lists, quality of service information, virtual disk information and route information. Some or all of the information maintained by switch manager 1740 can be stored in memory 1750, which can be a disk drive, a random access memory, a flash memory, or some other suitable storage medium. A virtual disk may be created by defining its SCSI characteristics and its mapping to a volume established by volume manager 1730. SCSI characteristics may include block size, device size, inquiry data, and mode pages. In one embodiment, the virtual disk is a computing system wide entity in that its definition does not bind it to any specific appliance node. A route to the device can also be created. In general, a route binds a virtual disk to a specific LUN on a specific port. Switch manager 1740 receives and processes one or more I/O interface commands (e.g., SCSI commands), as part of its virtual disk maintenance functionality.

A SCSI target device contains one or more logical units (LUNs) and target ports (sometimes referred to as targets) and receives device service and task management requests for processing. A logical unit is an externally addressable entity within a target that implements a SCSI device model and contains a device server. A device server is an object within a logical unit that executes SCSI tasks according to the rules of task management. Devices which comply with SCSI standards may include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices may be used as shared resources and shared data resources.

Switch manager 1740 may utilize volume information from volume manager 1730 and store it along with the information it maintains in memory 1750. For example, since volume manager 1730 is typically responsible for creating and maintaining snapshot volumes, it can provide information about a snapshot volume to switch manager 1740. Switch manager 1740 in turn stores the information in a way that is accessible using one or more I/O interface commands. For example, switch manager 1740 includes the virtual device information from volume manager 1730 in inquiry data that is accessible using the SCSI-3 INQUIRY command. In this way, additional information about the virtual disks and their related volumes is made accessible to hosts 136A and 136B as well as client computer systems 111. For example, an application operating on host 136, e.g., a backup and restoration application, can query SAN switch 1710 using a SCSI-3 INQUIRY to gather information about the relationship among virtual disks and/or corresponding volumes.

Client host interface 1760 provides a user interface, e.g., a command line interface or a graphical user interface, for the management of volume manager 1730, switch manager 1740, and/or other features of SAN switch 1710. Additionally, client host interface 1760 can serve as an additional interface for accessing and/or modifying information stored in memory 1750, such as the aforementioned virtual device information.

Figure 18:
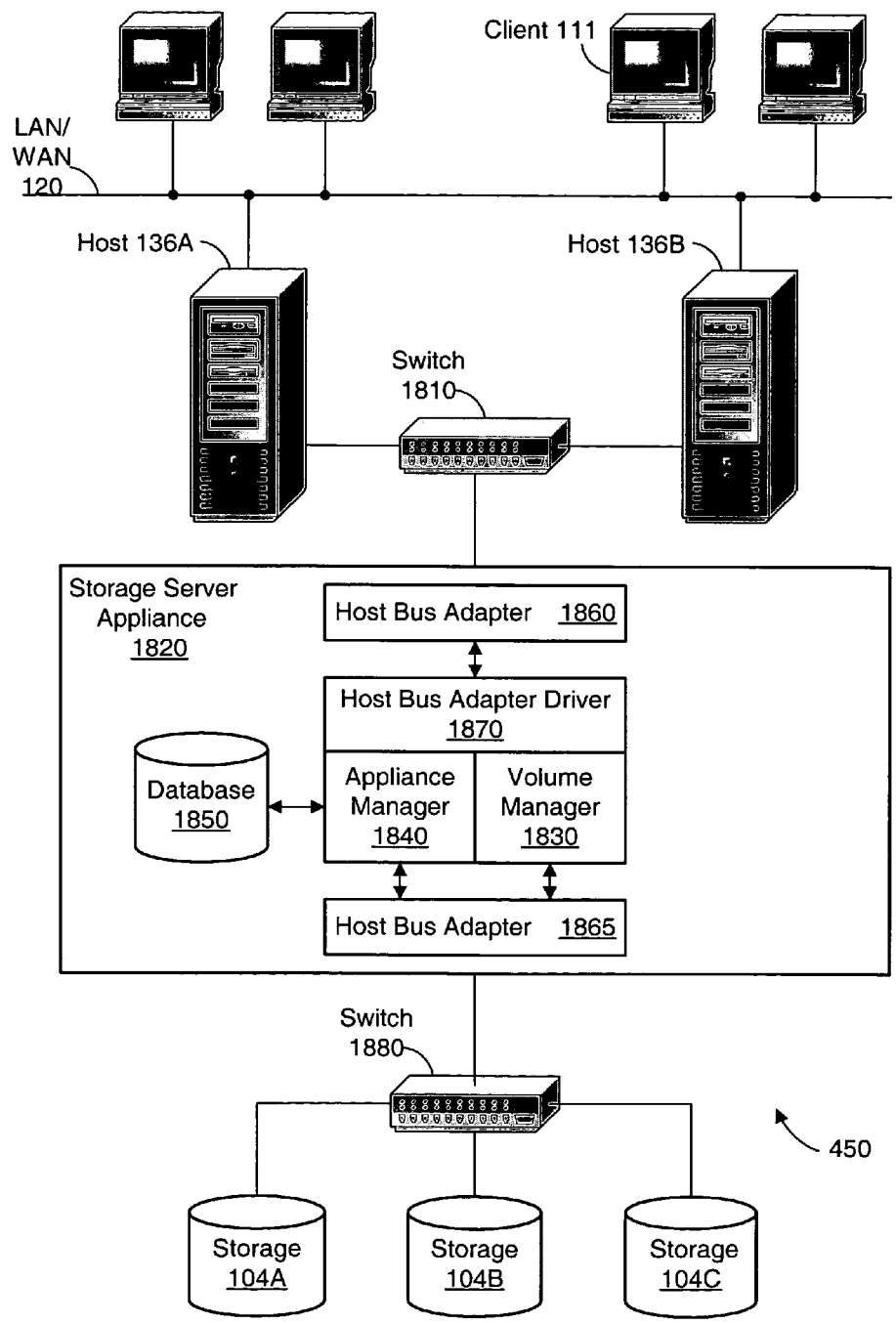
FIG. 18 is a block diagram illustrating one embodiment of a computing system configured to perform appliance-based block virtualization.

FIG. 18 illustrates an embodiment in which storage virtualization is maintained by a storage server appliance 1820. In general, storage server appliance 1820 differs from SAN switch 1710 in that SAN switch 1710 may be a specialized piece of hardware, while storage server appliance 1820 is typically a conventional computer system, e.g., a server, that operates additional software to provide storage server appliance functionality. An example of the type of software used to provide such functionality on conventional server hardware is the VERITAS ServPoint™ Appliance Software for SAN product provided by VERITAS Software Corporation. To enhance storage server appliance 1820's integration with computing system 450, e.g., to provide additional virtualization information to applications executing on hosts 136A and 136B, the systems, methods, and software of the present invention can be utilized.

Computing system 450 may utilize two switches 1810 and 1880 to provide front side and back side storage networks. Switch 1880 links all of the storage devices 104A, 104B, and 104C to the storage server appliance 1820. Similarly, switch 1810 links all of the storage clients, e.g., hosts 136A and 136B, to storage server appliance 1820. For added fault tolerance, multiple switches and data paths can be used as is well known to those having ordinary skill in the art.

Switch 1810 is coupled to host bus adapter 1860 of storage server appliance 1820. Host bus adapter 1860 is typically a SCSI or Fibre Channel adapter supporting a high speed/bandwidth connection. Host bus adapter driver 1870 supports I/O operations from storage clients, and interface with appliance manager 1840 and volume manager 1830. In general, appliance manager 1840 and volume manager 1830 operate in much the same manner as switch manager 1740 and volume manager 1730. In particular, appliance manager 1840 maintains data objects such as access control lists, quality of service information, virtual disk information (including the specialized information described above) and route information. Such information is stored in database 1850, which is typically stored on one or more disk drives local to storage server appliance 1820. In this manner, certain hardware and/or software of storage server appliance 1820 may operate as an I/O processor.

Figure 19:
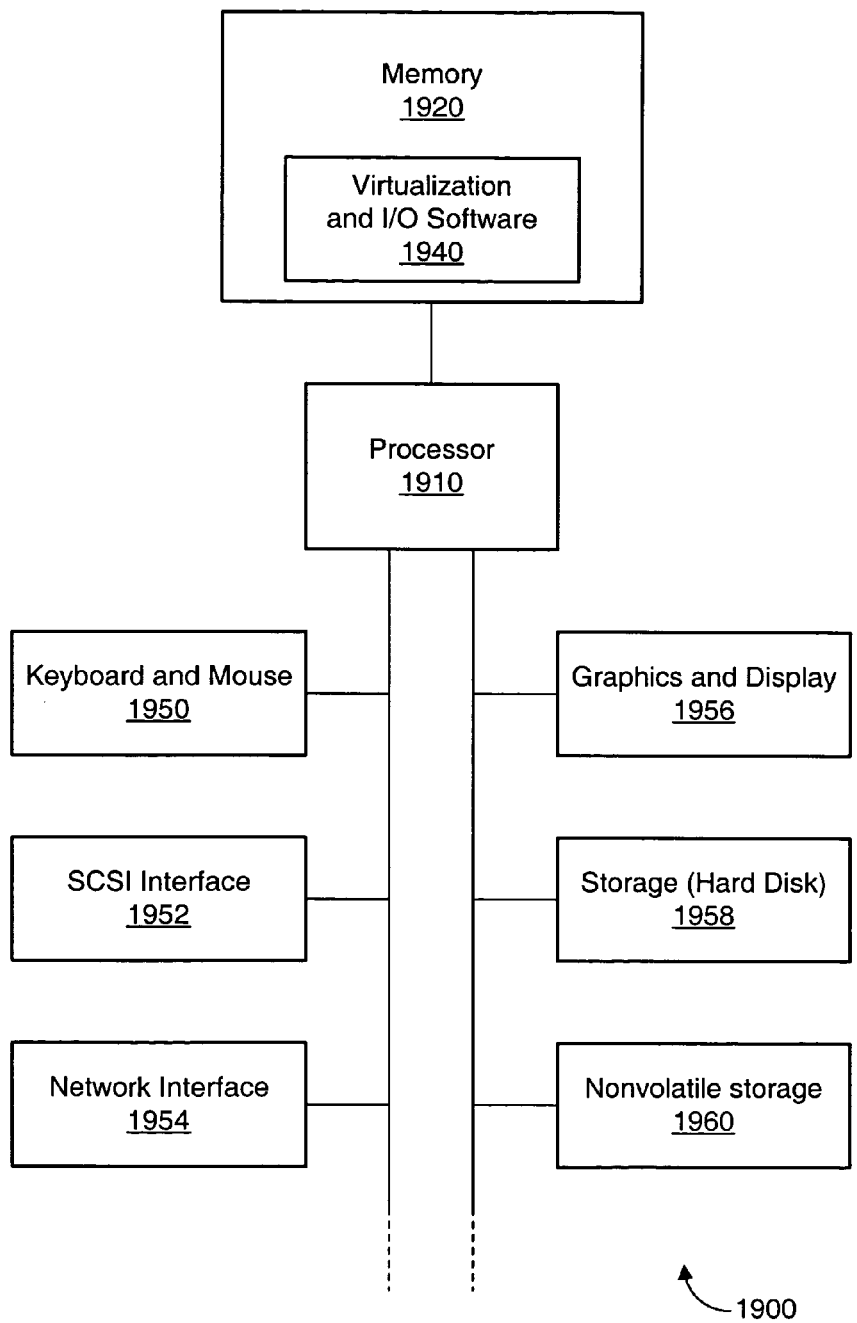
FIG. 19 is a block diagram illustrating one embodiment of an individual computer system.

FIG. 19 illustrates a block diagram of a typical computer system 1900 for implementing embodiments of the systems and methods described above for distributed block virtualization. For example, computer system 1900 can be illustrative of one of the previously described cluster nodes, i.e. of hosts 136. Computer system 1900 may also be illustrative of clients 111. Computer system 1900 includes a processor 1910 and a memory 1920 coupled by communications bus 1905. Processor 1910 can be a single processor or a number of individual processors working together. Memory 1920 is typically random access memory (RAM), or some other dynamic storage device, and is capable of storing instructions to be executed by the processor, e.g., virtualization and I/O software 1940. Memory 1920 is also used for storing temporary variables or other intermediate information during the execution of instructions by the processor 1910.

Computer system 1900 may also include devices such as keyboard & mouse 1950, SCSI interface 1952, network interface 1954, graphics & display 1956, hard disk 1958, and other nonvolatile storage 1960, all of which are coupled to processor 1910 by communications bus 1907. In various embodiments, nonvolatile storage 1960 may include optical media devices such as read-only or writable CD or DVD, solid-state devices such as nonvolatile RAM, or any other suitable type of nonvolatile storage. It will be apparent to those having ordinary skill in the art that computer system 1900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 1940 may comprise program instructions executable, for example by one or more processors 1910, to perform any of the functions or methods described above such as block virtualization, volume management, storage mirroring, snapshots, data replication, volume tunneling, etc. In particular, in various embodiments any of the functions performed by or included within volume server 135, volume client 136, or volume consumer 138 as described above may be implemented as software 1940.

Also, in some embodiments software 1940 can be provided to the computer system via a variety of computer-accessible media including electronic media (e.g., flash memory), magnetic storage media (e.g., hard disk 1958, a floppy disk, etc.), optical storage media (e.g., CD-ROM 1960), and communications media conveying signals encoding the instructions (e.g., via a network coupled to network interface 1954). In some embodiments, separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

It is noted that in any of the distributed block virtualization architectures described in conjunction with FIGS. 1-19, replication of distributed block virtualization may be used. Replication techniques may include, for example, distributed logging and FMR3 (Fast Mirror Resync of VERITAS Volume Manager from VERITAS Software Corporation) snap-points. In various embodiments, it is contemplated that replication techniques may be used with either symmetric or asymmetric distributed block virtualization, with or without snapshots, mirroring, or other techniques.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
a volume server;
a first and a second client computer system; and
a plurality of physical block devices;
wherein the volume server is configured to:
aggregate storage in the plurality of physical block devices into a plurality of logical volumes, wherein a given logical volume includes storage from at least two physical block devices;
distribute a first subset including at least two of said plurality of logical volumes to said first and second client computer systems for input/output as a first volume set configured to be accessed as a single logical device;
wherein said first volume set comprises a plurality of independent logical block address spaces corresponding respectively to members of said first subset of logical volumes, and wherein said first volume set is configured such that modification of a configuration of a given one of said independent logical block address spaces occurs without perturbing configurations of other ones of said independent logical block address spaces.

2. The system as recited in claim 1, wherein the volume server is further configured to distribute a second subset including at least two of said plurality of logical volumes to one or more of said first and second client computer systems for input/output as a second volume set configured to be accessed as a single logical device.

3. The system as recited in claim 2, wherein said second volume set is configured to replicate data stored in said first volume set.

4. The system as recited in claim 2, wherein said second volume set is configured to store a respective snapshot of data stored in one or more logical volumes of said first volume set.

5. The system as recited in claim 2, wherein said volume server is further configured to symmetrically distribute each of said volume sets to each of said client computer systems.

6. The system as recited in claim 2, wherein said volume server is further configured to asymmetrically distribute said volume sets among said client computer systems.

7. A system comprising:
a plurality of block devices; and
a first volume server configured to aggregate storage in said plurality of block devices into a plurality of logical volumes;
wherein said first volume server is further configured to present at least two of said plurality of logical volumes as a first volume set configured to be accessed as a single logical device;
wherein said first volume server is further configured to present at least two of said plurality of logical volumes as a second volume set configured to be accessed as a single logical device;
wherein said second volume set is configured to replicate data stored in said first volume set; and
wherein each of said first and said second volume sets comprises a respective plurality of independent logical block address spaces, wherein each of said independent logical block address spaces corresponds to a respective one of said logical volumes included within a corresponding one of said first or said second volume sets, and wherein said first and second volume sets are configured such that modification of a configuration of a given one of said independent logical block address spaces occurs without perturbing configurations of other ones of said independent logical block address spaces.

8. The system as recited in claim 7, wherein each logical volume included in said first volume set corresponds to a respective logical volume included in said second volume set, wherein each logical volume included in said first volume set is associated with a respective volume identifier, and wherein each logical volume included in said second volume set is associated with the respective volume identifier associated with the corresponding logical volume included in said first volume set.

9. The system as recited in claim 8, wherein each of said respective volume identifiers includes an index number.

10. The system as recited in claim 7, wherein said first volume set is presented to a first computer system and said second volume set is presented to a second computer system, wherein block writes to said first volume set performed by said first computer system are conveyed to said second computer system to be written to said second volume set.

11. The system as recited in claim 7, wherein each block write performed to said second volume set occurs in the same order as corresponding block writes performed to said first volume set.

12. The system as recited in claim 7, wherein block writes performed to said first volume set are organized into a plurality of groups, and wherein a given one of said plurality of groups is written atomically to said second volume set.

13. A system comprising:
a plurality of block devices; and
a volume server configured to aggregate storage in said plurality of block devices into a plurality of logical volumes;
wherein said volume server is further configured to present at least two of said plurality of logical volumes as a volume set configured to be accessed as a single logical device;
wherein a second logical volume included in said volume set is configured to store a snapshot of data stored in a first logical volume included in said volume set; and
wherein said volume set comprises a plurality of independent logical block address spaces corresponding respectively to ones of said at least two of said logical volumes, and wherein said volume said is configured such that modification of a configuration of a given one of said independent logical block address spaces occurs without perturbing configurations of other ones of said independent logical block address spaces.

14. The system as recited in claim 13, wherein said second logical volume is further configured to store said snapshot of data stored in said first logical volume as of a snapshot effective time, and wherein in response to a given data block of said first logical volume being written after the snapshot effective time, said second logical volume is configured to store an original value of said given data block prior to said writing.

15. The system as recited in claim 14, wherein a request to read a particular data block of said snapshot of data returns a corresponding data block of a block device associated with said first logical volume if said particular data block has not been written after the snapshot effective time, and wherein said request returns a corresponding data block of a block device associated with said second logical volume if said particular data block has been written after the snapshot effective time.

16. The system as recited in claim 13, wherein said volume set further includes a third and a fourth logical volume, wherein said fourth logical volume is configured to store a snapshot of data stored in said third logical volume, and wherein said fourth logical volume and said second logical volume are configured to store respective snapshot data in a shared logical or physical block storage device.

17. The system as recited in claim 13, wherein said first logical volume is configured to mirror said data stored therein onto a mirror device, and wherein subsequent to completion of said mirroring, said mirror device is detached from said first logical volume and presented as said second logical volume.

18. The system as recited in claim 13, wherein adding a given snapshot logical volume to said volume set or removing said given snapshot logical volume from said volume set respectively comprise adding or removing a corresponding logical block address space of said given snapshot logical volume, wherein said corresponding logical block address space is independent of respective logical block address spaces corresponding to other logical volumes included in said volume set.

19. A system comprising:
a plurality of block devices; and
a volume server configured to aggregate storage in said plurality of block devices into a plurality of logical volumes;
wherein said volume server is further configured to present a first subset including at least two of said plurality of logical volumes as a first volume set configured to be accessed as a single logical device;
wherein said volume server is further configured to present a second subset including at least two of said plurality of logical volumes as a second volume set configured to be accessed as a single logical device;
wherein said second volume set is configured to store a snapshot of data stored in one or more logical volumes included in said first volume set; and
wherein each of said first and said second volume sets comprises a respective plurality of independent logical block address spaces, wherein each of said independent logical block address spaces corresponds to a respective one of said logical volumes included within a corresponding one of said first or said second volume sets, and wherein said first and second volume sets are configured such that modification of a configuration of a given one of said independent logical block address spaces occurs without perturbing configurations of other ones of said independent logical block address spaces.

20. The system as recited in claim 19, wherein said second volume set is further configured to store said snapshot of data stored in said one or more logical volumes included in said first volume set as of a snapshot effective time, and wherein in response to a given data block of said one or more logical volumes included in said first volume set being written after the snapshot effective time, said second volume set is configured to store an original value of said given data block prior to said writing.

21. The system as recited in claim 20, wherein a request to read a particular data block of said snapshot of data returns a corresponding data block of a block device associated with said first volume set if said particular data block has not been written after the snapshot effective time, and wherein said request returns a corresponding data block of a block device associated with said second volume set if said particular data block has been written after the snapshot effective time.

22. The system as recited in claim 19, wherein said second volume set is further configured to store respective snapshot data of a plurality of logical volumes included in said first volume said in a shared logical or physical block storage device.

23. The system as recited in claim 19, wherein a first logical volume included in said first volume set is configured to mirror said data stored therein onto a mirror device, and wherein subsequent to completion of said mirroring, said mirror device is detached from said first logical volume and presented as a corresponding logical volume of said second volume set.

24. The system as recited in claim 19, wherein adding a given snapshot logical volume to said second volume set or removing said given snapshot logical volume from said second volume set respectively comprise adding or removing a corresponding logical block address space of said given snapshot logical volume, wherein said corresponding logical block address space is independent of respective logical block address spaces corresponding to other logical volumes included in said second volume set.

25. The system as recited in claim 19, wherein each logical volume included in said first volume set corresponds to a respective logical volume included in said second volume set, wherein each logical volume included in said first volume set is associated with a respective volume identifier, and wherein each logical volume included in said second volume set is associated with the respective volume identifier associated with the corresponding logical volume included in said first volume set.

26. The system as recited in claim 25, wherein each of said respective volume identifiers includes an index number.

27. A system, comprising:
a client computer system;
a plurality of block devices; and
a volume server configured to aggregate storage in said plurality of block devices into a plurality of logical volumes;
wherein said volume server is further configured to present at least two of said plurality of logical volumes as a volume set configured to be accessed as a single logical device;
wherein said volume server is further configured to map said volume set to a device address space recognizable by an operating system running on said client computer system; and
wherein said volume set comprises a plurality of independent logical block address spaces corresponding respectively to ones of said at least two of said logical volumes, wherein said volume set is configured such that modification of a configuration of a given one of said independent logical block address spaces occurs without perturbing configurations of other ones of said independent logical block address spaces.

28. The system as recited in claim 27, wherein each volume included in said volume set is mapped into a single Logical Unit (LUN) address space.

29. The system as recited in claim 27, wherein said mapping includes locating metadata specific to said operating system within said device address space.

30. The system as recited in claim 27, wherein said client computer system includes a mapping driver configured to access blocks stored within said volume set via said device address space according to said mapping.

31. The system as recited in claim 27, wherein said volume server is implemented within a Storage Area Network (SAN) switch.

32. A method comprising:
aggregating storage in a plurality of physical block devices into a plurality of logical volumes, wherein a given logical volume includes storage from at least two physical block devices; and
distributing a first subset including at least two of said plurality of logical volumes to a first and a second client computer system for input/output as a first volume set configured to be accessed as a single logical device;
wherein said first volume set comprises a plurality of independent logical block address spaces corresponding respectively to members of said first subset of logical volumes, and wherein said first volume set is configured such that modification of a configuration of a given one of said independent logical block address spaces occurs without perturbing configurations of other ones of said independent logical block address spaces.

* * * * *